(12) United States Patent
Yamashita

(10) Patent No.: US 11,616,704 B2
(45) Date of Patent: Mar. 28, 2023

(54) INFORMATION PROCESSING METHOD, STORAGE MEDIUM, AND INFORMATION PROCESSING DEVICE

(71) Applicant: FUJITSU LIMITED, Kawasaki (JP)

(72) Inventor: Shinji Yamashita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 17/527,334

(22) Filed: Nov. 16, 2021

(65) Prior Publication Data

US 2022/0286372 A1    Sep. 8, 2022

(30) Foreign Application Priority Data

Mar. 8, 2021    (JP) .............................. JP2021-036448

(51) Int. Cl.
*H04L 43/067* (2022.01)
*H04L 43/045* (2022.01)
*H04L 43/0817* (2022.01)
*H04L 67/02* (2022.01)
*H04L 43/04* (2022.01)
*H04L 9/40* (2022.01)

(52) U.S. Cl.
CPC ............ *H04L 43/067* (2013.01); *H04L 43/04* (2013.01); *H04L 43/045* (2013.01); *H04L 43/0817* (2013.01); *H04L 63/1425* (2013.01); *H04L 67/02* (2013.01)

(58) Field of Classification Search
None
See application file for complete search history.

(56) References Cited

U.S. PATENT DOCUMENTS

| | | | |
|---|---|---|---|
| 2016/0013995 A1* | 1/2016 | Yamada | H04L 43/10 370/252 |
| 2018/0176241 A1* | 6/2018 | Manadhata | G06F 16/2477 |
| 2018/0309637 A1* | 10/2018 | Gill | H04L 43/067 |
| 2018/0337832 A1* | 11/2018 | Yamashita | H04L 41/147 |
| 2018/0351823 A1 | 12/2018 | Nakatsugawa | |
| 2019/0238581 A1* | 8/2019 | Song | G06F 16/2474 |
| 2019/0373007 A1* | 12/2019 | Salunke | G06F 11/3423 |

(Continued)

FOREIGN PATENT DOCUMENTS

| | | |
|---|---|---|
| JP | 2018-195929 | 12/2018 |
| JP | 2018-207241 | 12/2018 |

OTHER PUBLICATIONS

Patcha et al., "Network anomaly detection with incomplete audit data", Computer Networks, Elsevier, Amsterdam, NL, vol. 51, No. 13, Jul. 12, 2007, pp. 3935-3955, XP022151605, ISSN: 1389-1286.

(Continued)

*Primary Examiner* — Lashonda Jacobs-Burton
(74) *Attorney, Agent, or Firm* — Staas & Halsey LLP

(57) ABSTRACT

An information processing method for a computer to execute a process includes, acquiring a plurality of pieces of time-series data; calculating an index value that relates to periodicity at a certain time interval for each piece of aggregated time-series data obtained by dividing and aggregating the plurality of pieces of the time-series data in accordance with a certain unit of aggregation; determining the each piece of the aggregated time-series data as an analysis target when the index value satisfies a certain condition; and performing certain analysis processing on the analysis target.

13 Claims, 19 Drawing Sheets

(56) References Cited

U.S. PATENT DOCUMENTS

| | | | |
|---|---|---|---|
| 2020/0073740 A1* | 3/2020 | Ohana | G06F 11/0793 |
| 2020/0293018 A1* | 9/2020 | Tsunoo | G05B 23/0221 |
| 2021/0014144 A1* | 1/2021 | Iwai | H04L 41/5009 |
| 2022/0083531 A1* | 3/2022 | Buda | G06N 3/04 |
| 2022/0124110 A1* | 4/2022 | Chhabra | H04L 63/1425 |
| 2022/0138624 A1* | 5/2022 | Mizoguchi | G06F 18/2163 |
| | | | 706/15 |
| 2022/0188570 A1* | 6/2022 | Iizawa | G06N 20/00 |
| 2022/0245010 A1* | 8/2022 | Taropa | G06F 11/3072 |
| 2022/0253461 A1* | 8/2022 | Togawa | G06F 16/285 |

OTHER PUBLICATIONS

European Search Report dated May 9, 2022, in European Application No. 21208451.1.

* cited by examiner

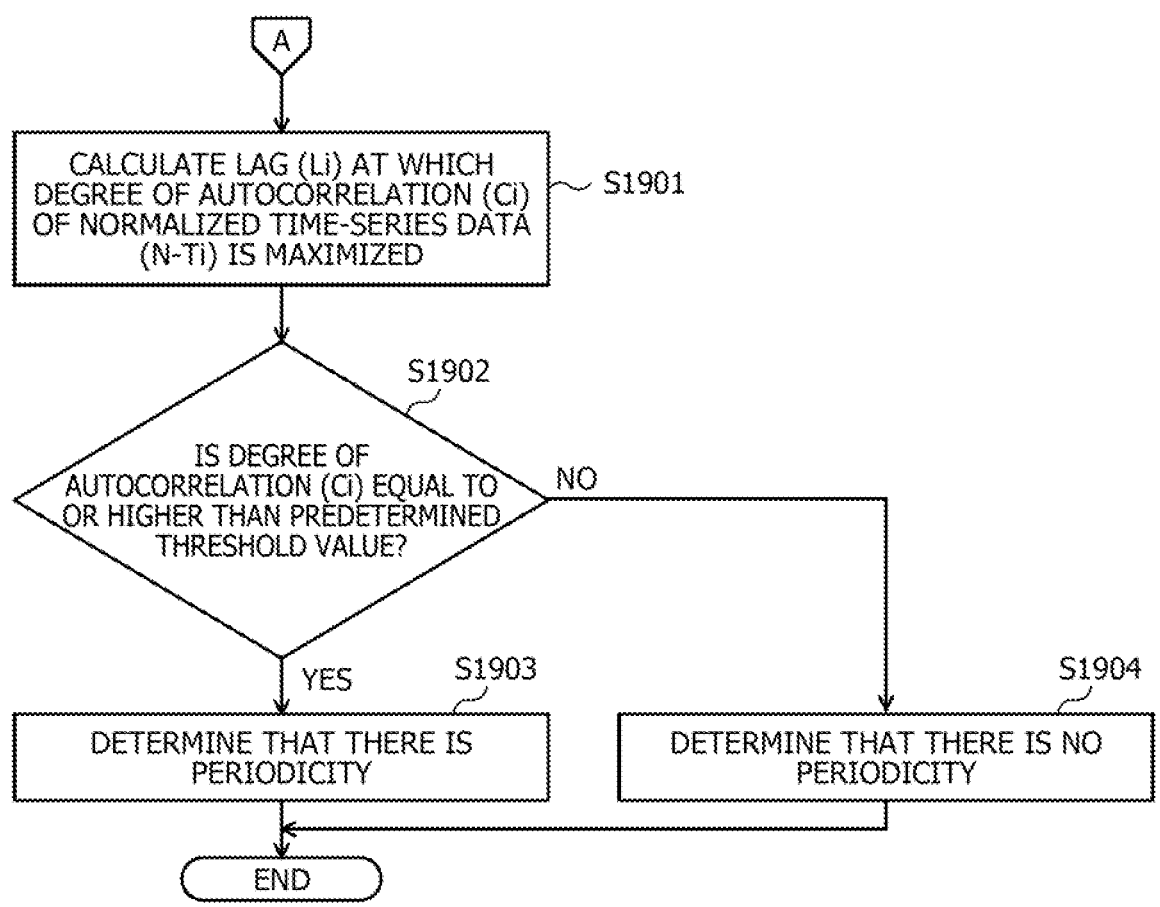

INFORMATION PROCESSING METHOD, STORAGE MEDIUM, AND INFORMATION PROCESSING DEVICE

CROSS-REFERENCE TO RELATED APPLICATION

This application is based upon and claims the benefit of priority of the prior Japanese Patent Application No. 2021-36448, filed on Mar. 8, 2021, the entire contents of which are incorporated herein by reference.

FIELD

The embodiments discussed herein are related to an information processing method, a storage medium, and an information processing device.

BACKGROUND

In the past, cloud system managers have wanted to grasp whether a cloud system is working normally. Therefore, it is desired to collect monitoring log information on the cloud system and allow to detect that some anomaly has occurred in the cloud system based on the collected monitoring log information. The monitoring log information is, for example, time-series data indicating a temporal change in some feature amount. The feature amount is, for example, a traffic amount.

As the prior art, for example, there is a technique of performing an anomaly verification process by calculating a predicted value of a traffic amount from a traffic model to calculate a traffic anomaly based on a difference between the predicted value and the actually measured value of the traffic amount and comparing the traffic anomaly with a preset threshold value.

Japanese Laid-open Patent Publication No. 2018-195929 is disclosed as related art.

SUMMARY

According to an aspect of the embodiments, an information processing method for a computer to execute a process includes, acquiring a plurality of pieces of time-series data; calculating an index value that relates to periodicity at a certain time interval for each piece of aggregated time-series data obtained by dividing and aggregating the plurality of pieces of the time-series data in accordance with a certain unit of aggregation; determining the each piece of the aggregated time-series data as an analysis target when the index value satisfies a certain condition; and performing certain analysis processing on the analysis target.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 19 is a flowchart (part 2) illustrating an example of the periodicity verification processing procedure.

DESCRIPTION OF EMBODIMENTS

In the past technique, the accuracy of analysis of the time-series data is poor in some cases. For example, an approach of validating whether or not some anomaly has occurred in the cloud system based on aggregated monitoring log information obtained by aggregating a plurality of pieces of monitoring log information is conceivable. In this approach, if the number of pieces of monitoring log information to be aggregated is inappropriate, the accuracy of validating whether or not some anomaly has occurred in the cloud system deteriorates.

In one aspect, the present embodiments aim to improve the accuracy of analysis of time-series data.

According to one mode, the accuracy of analysis of time-series data may be improved.

Hereinafter, embodiments of an information processing method and an information processing program will be described in detail with reference to the drawings.

(One Example of Information Processing Method According to Embodiment)

Figure 1:
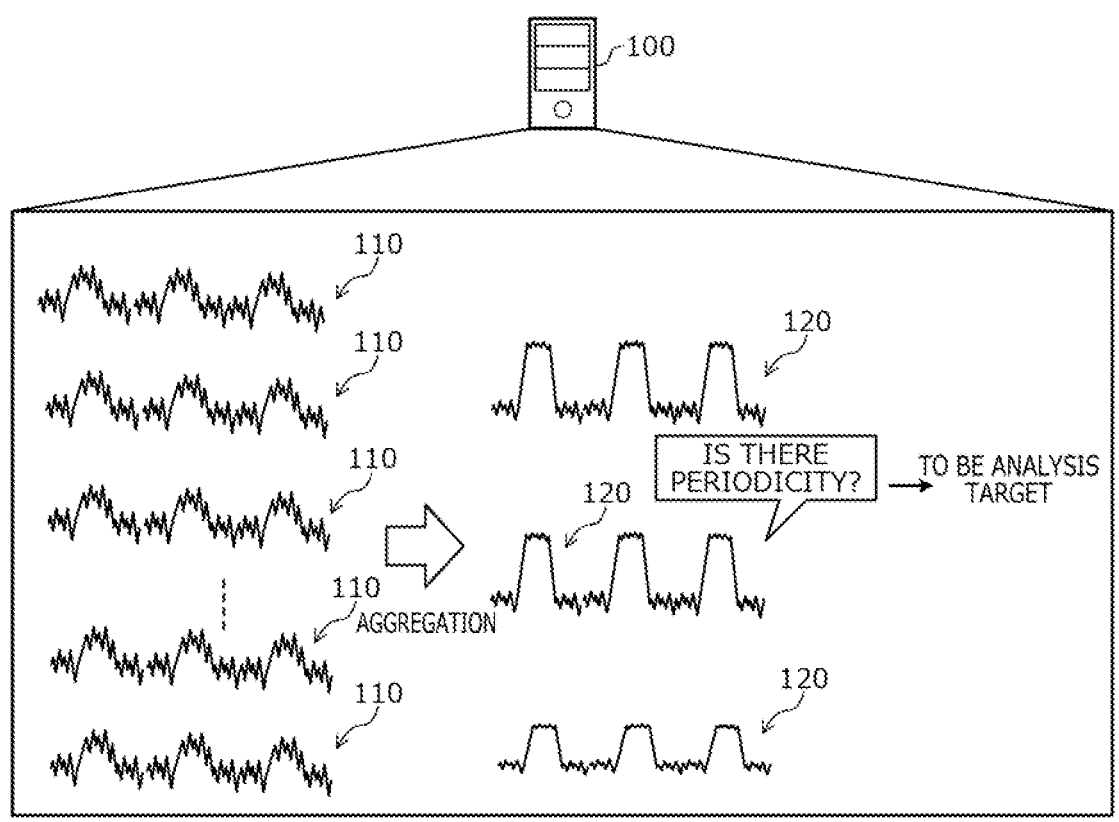
FIG. 1 is an explanatory diagram illustrating one example of an information processing method according to an embodiment.

FIG. 1 is an explanatory diagram illustrating one example of an information processing method according to an embodiment. In FIG. 1, an information processing device 100 is a computer for improving the accuracy of analysis of time-series data. The time-series data indicates a temporal change in some feature amount.

The analysis is performed based on, for example, aggregated time-series data obtained by aggregating a plurality of pieces of the time-series data. For example, detection of an anomaly or the like relating to some system is conceivable as the analysis. The aggregated time-series data indicates, for example, a temporal change in statistic of the feature amount. For example, the statistic of the feature amount is a maximum value, a minimum value, an average value, a median value, a mode value, a variance, or the like in a plurality of feature amounts.

In the past, an approach of collecting monitoring log information on a system and allowing to detect that some anomaly has occurred in the system based on the collected monitoring log information has been conceivable. For example, an approach of validating whether or not some anomaly has occurred in a system based on aggregated monitoring log information obtained by aggregating a plurality of pieces of monitoring log information has been conceivable. For example, an approach of applying a statistical approach to the aggregated monitoring log information to specify a normal range that the statistic of the feature amount can take, and validating whether or not some anomaly has occurred in the system based on whether or not the actually measured value of the statistic of the feature amount deviates from the normal range is conceivable.

However, in the past, the accuracy of analysis of the time-series data has been poor in some cases. For example, in the above approach, if the number of pieces of monitoring log information to be aggregated is inappropriate, the accuracy of validating whether or not some anomaly has occurred in the system deteriorates. For example, if the number of pieces of monitoring log information to be aggregated is too small, the statistical multiplexing effect becomes smaller, which will lead to the deterioration of the accuracy of validating whether or not some anomaly has occurred in the system. On the other hand, if the number of pieces of monitoring log information to be aggregated is too large, it will be difficult to distinguish which piece of the monitoring log information relates to a part of the system where the anomaly has occurred, among the pieces of monitoring log information that have been aggregated. This therefore leads to the deterioration of the accuracy of validating whether or not some anomaly has occurred in the system.

Thus, the present embodiments will describe an information processing method that may improve the accuracy of analysis of time-series data, by evaluating whether or not the number of pieces of the time-series data aggregated into aggregated time-series data is appropriate, on the basis of the periodicity of the statistic of the feature amount in the aggregated time-series data.

(1-1) The information processing device 100 acquires a plurality of pieces of time-series data 110. The respective pieces of the time-series data 110 are, for example, data relating to different users. Each piece of the time-series data 110 is, for example, data indicating a temporal change in the same type of feature amount.

(1-2) The information processing device 100 generates one or more pieces of aggregated time-series data 120 by dividing and aggregating the acquired plurality of pieces of time-series data 110 in accordance with a predetermined unit of aggregation. The unit of aggregation defines which piece of time-series data 110 among the plurality of pieces of time-series data 110 is to be aggregated. The unit of aggregation defines, for example, the number of pieces of the time-series data to be aggregated. The information processing device 100 generates one or more pieces of the aggregated time-series data 120 by, for example, dividing and aggregating the acquired plurality of pieces of time-series data 110 for each defined number.

The information processing device 100 calculates an index value relating to periodicity at a predetermined time interval for each piece of the aggregated time-series data 120 among the generated one or more pieces of the aggregated time-series data 120. The predetermined time interval is, for example, a preset time interval with a particular period of time. The index value is calculated based on, for example, a difference between the aggregated time-series data 120 and the aggregated time-series data 120 shifted by a particular period of time in a time axis direction. For example, the stronger the periodicity, the greater value the index value has. The index value has a greater value as the difference between the aggregated time-series data 120 and the aggregated time-series data 120 shifted by a particular period of time in the time axis direction becomes smaller, for example.

(1-3) When the calculated index value satisfies a predetermined condition, the information processing device 100 determines each piece of the aggregated time-series data 120 as an analysis target. The analysis is, for example, to validate whether or not an anomaly has occurred in some system, based on the aggregated time-series data 120. The predetermined condition is, for example, that the calculated index value is equal to or higher than a predetermined threshold value. For example, when all of the calculated index values satisfy the predetermined condition, the information processing device 100 determines each piece of the aggregated time-series data 120 as an analysis target.

For example, when all of the calculated index values are equal to or higher than a predetermined threshold value, the information processing device 100 determines each piece of the aggregated time-series data 120 as an analysis target. When all of the calculated index values are equal to or higher than the predetermined threshold value, for example, the information processing device 100 validates whether or not an anomaly has occurred in some system, based on each piece of the aggregated time-series data 120.

This allows the information processing device 100 to promote improvement in the accuracy of analysis of the time-series data 110. The information processing device 100 may evaluate, for example, whether or not the number of pieces of the time-series data 110 aggregated into the aggregated time-series data 120 is appropriate and accurately perform analysis processing based on the time-series data 110. For example, the information processing device 100 may perform analysis processing based on the time-series data 110 in a state in which the statistical multiplexing effect is relatively great. Furthermore, for example, the information processing device 100 may make it easy to distinguish which piece of the time-series data 110 relates to a part of the system where the anomaly has occurred, among the pieces of time-series data 110 that have been aggregated.

(1-4) There may be a case where the information processing device 100 alters the predetermined unit of aggregation when the calculated index value does not satisfy the predetermined condition. For example, the predetermined unit of aggregation is set to the minimum unit of aggregation in the initial state. The alteration is, for example, to increase the predetermined unit of aggregation. In this case, the information processing device 100 calculates the index value for each piece of the aggregated time-series data 120 among the one or more pieces of the aggregated time-series data 120 obtained by dividing and aggregating the plurality of pieces of the time-series data 110 in accordance with the predetermined unit of aggregation after the alteration. Then, when the calculated index value satisfies the predetermined condition, the information processing device 100 determines each piece of the aggregated time-series data 120 as an analysis target.

This allows the information processing device 100 to promote improvement in the accuracy of analysis of the time-series data 110. For example, if the number of pieces of the time-series data 110 aggregated into the aggregated time-series data 120 is inappropriate, the information processing device 100 may alter the number of pieces of time-series data 110 to be aggregated into the aggregated time-series data 120. Then, the information processing device 100 may perform analysis processing based on the time-series data 110 if the number of pieces of the time-series data 110 aggregated into the aggregated time-series data 120 has become appropriate. Therefore, the information processing device 100 may accurately perform the analysis processing based on the time-series data 110.

Here, a description has been given of a case where the predetermined unit of aggregation is set to the minimum unit of aggregation in the initial state, and when the calculated index value does not satisfy the predetermined condition, the information processing device 100 alters the predetermined unit of aggregation such that the predetermined unit of aggregation becomes greater. However, the predetermined unit of aggregation is not limited to this case.

For example, there may be a case where the predetermined unit of aggregation is not set to the minimum unit of aggregation in the initial state. For example, there may be a case where the predetermined unit of aggregation is set to the maximum unit of aggregation in the initial state. In this case, for example, there may be a case where the information processing device 100 calculates the index value for each piece of the aggregated time-series data 120 among the one or more pieces of the aggregated time-series data 120 in the unit of aggregation, in an order from the maximum unit of aggregation. Then, for example, the information processing device 100 selects a minimum unit of aggregation among units of aggregation whose calculated index values satisfy the predetermined condition and determines the aggregated time-series data 120 in the selected unit of aggregation, as an analysis target.

Furthermore, for example, there may be a case where the information processing device 100 calculates the index value for each piece of the aggregated time-series data 120 among the one or more pieces of the aggregated time-series data 120 in each unit of aggregation among a plurality of units of aggregation at a time. In this case, for example, the information processing device 100 selects a minimum unit of aggregation among units of aggregation whose calculated index values satisfy the predetermined condition among the plurality of units of aggregation and determines the aggregated time-series data 120 in the selected unit of aggregation, as an analysis target.

Furthermore, for example, there may be a case where the information processing device 100 randomly sets the unit of aggregation and calculates the index value for each piece of the aggregated time-series data 120 among the one or more pieces of the aggregated time-series data 120 in the unit of aggregation. Then, for example, the information processing device 100 determines the aggregated time-series data 120 in a unit of aggregation whose calculated index value satisfies the predetermined condition and which has been first found, as an analysis target.

Here, a case where the information processing device 100 determines each piece of the aggregated time-series data 120 as an analysis target when all of the calculated index values satisfy the predetermined condition has been described, but the predetermined condition is not limited to this case. For example, there may be a case where the information processing device 100 determines each piece of the aggregated time-series data 120 as an analysis target when at least one of the calculated index values satisfies the predetermined condition.

Furthermore, for example, there may be a case where the information processing device 100 determines the aggregated time-series data 120 whose calculated index value satisfies the predetermined condition, as an analysis target, among the one or more pieces of the aggregated time-series data 120. In this case, the information processing device 100 alters the unit of aggregation and recalculates the index value for the time-series data 110 aggregated into each piece of the aggregated time-series data 120 that has not been determined as the analysis target. Then, the information processing device 100 determines the aggregated time-series data 120 whose calculated index value satisfies the predetermined condition, as an analysis target.

(Example of Analysis Processing System 200)

Next, an example of an analysis processing system 200 to which the information processing device 100 illustrated in FIG. 1 is applied will be described with reference to FIG. 2.

Figure 2:
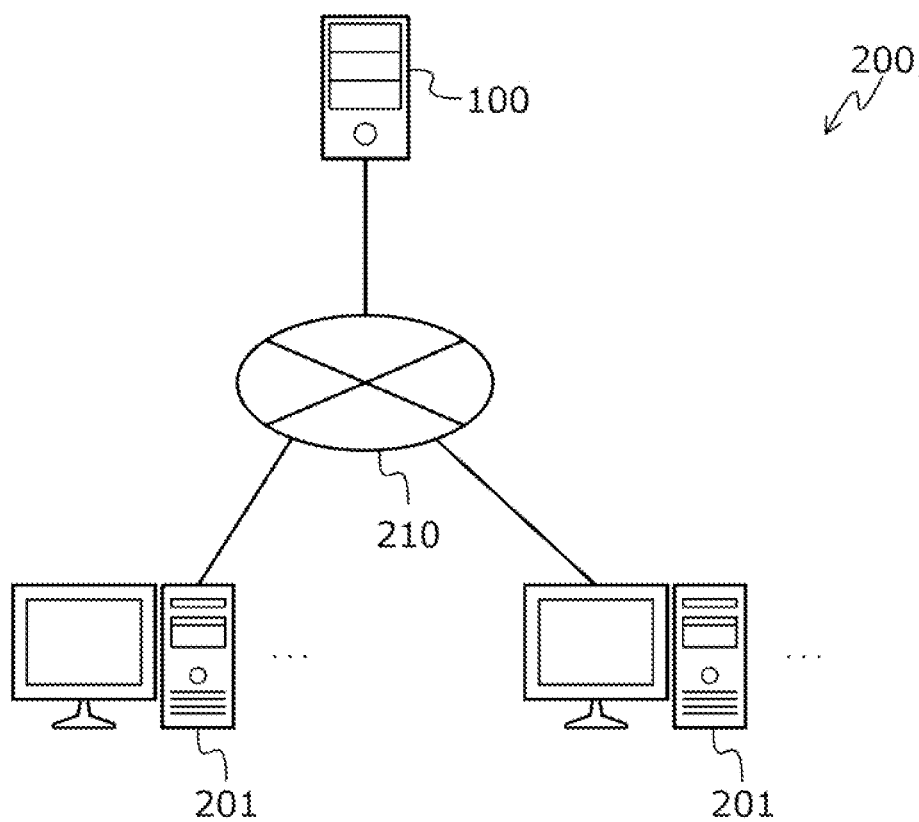
FIG. 2 is an explanatory diagram illustrating an example of an analysis processing system 200.

FIG. 2 is an explanatory diagram illustrating an example of the analysis processing system 200. In FIG. 2, the analysis processing system 200 includes the information processing device 100 and terminal devices 201.

In the analysis processing system 200, the information processing device 100 and the terminal devices 201 are connected via a wired or wireless network 210. For example, the network 210 is a local area network (LAN), a wide area network (WAN), the Internet, or the like.

The information processing device 100 is a computer used by an administrator of some system. The system is formed, for example, by one or more terminal devices 201. The information processing device 100 acquires a plurality of pieces of time-series data. The information processing device 100 acquires the plurality of pieces of time-series data, for example, by receiving the plurality of pieces of time-series data from the terminal device 201. The information processing device 100 uses the acquired plurality of pieces of time-series data to search for a unit of aggregation that is validated to be appropriate.

The information processing device 100 verifies whether or not the index value relating to periodicity at a predetermined time interval in aggregated time-series data in which pieces of the time-series data are aggregated satisfies the predetermined condition, for example, while altering the unit of aggregation. The information processing device 100 validates a unit of aggregation whose index value satisfies the predetermined condition to be appropriate and performs analysis processing using the plurality of pieces of the time-series data in line with the unit of aggregation. The information processing device 100 outputs the result of performing the analysis processing in a manner that allows the administrator to refer to the result. For example, the information processing device 100 is a server, a personal computer (PC), or the like.

The terminal device 201 is a computer that forms some system. The terminal device 201 generates time-series data. For example, the terminal device 201 measures the traffic amount in the own device and generates time-series data indicating a temporal change in the traffic amount. The terminal device 201 transmits the time-series data to the information processing device 100. For example, the terminal device 201 is a PC, a tablet terminal, a smartphone, or the like.

(Specific Example of Analysis Processing System 200)

The analysis processing system 200 is applied to, for example, detection of an anomaly in some system formed by one or more terminal devices 201 in some cases. In this case, the information processing device 100 generates one or more pieces of aggregated time-series data by dividing and aggregating a plurality of pieces of the time-series data in accordance with a unit of aggregation validated to be appropriate. The aggregated time-series data, for example, indicates a temporal change in statistic of the traffic amount. The statistic is, for example, a maximum value. Then, the information processing device 100 performs detection of an anomaly in some system formed by one or more terminal devices 201, based on the generated one or more pieces of the aggregated time-series data.

The information processing device 100 specifies a normal range that the statistic of the traffic amount can take, for example, by applying a statistical approach to each piece of the aggregated time-series data among the generated one or more pieces of the aggregated time-series data. Then, the information processing device 100 verifies, for example, whether or not the actually measured value of the statistic of the traffic amount deviates from the specified normal range in each piece of the aggregated time-series data. Based on the result of the verification, the information processing device 100 validates whether or not some anomaly has occurred in some system formed by one or more terminal devices 201.

For example, the information processing device 100 specifies aggregated time-series data whose actually measured value of the statistic of the traffic amount deviates from the specified normal range, from among the one or more pieces of the aggregated time-series data. Then, for example, the information processing device 100 validates that an anomaly has occurred in a part of some system formed by one or more terminal devices 201 corresponding to one piece of time-series data among one or more pieces of time-series data aggregated into the specified aggregated time-series data. This allows the information processing device 100 to accurately perform detection of an anomaly in some system formed by one or more terminal devices 201.

(Hardware Configuration Example of Information Processing Device 100)

Next, a hardware configuration example of the information processing device 100 will be described with reference to FIG. 3.

Figure 3:
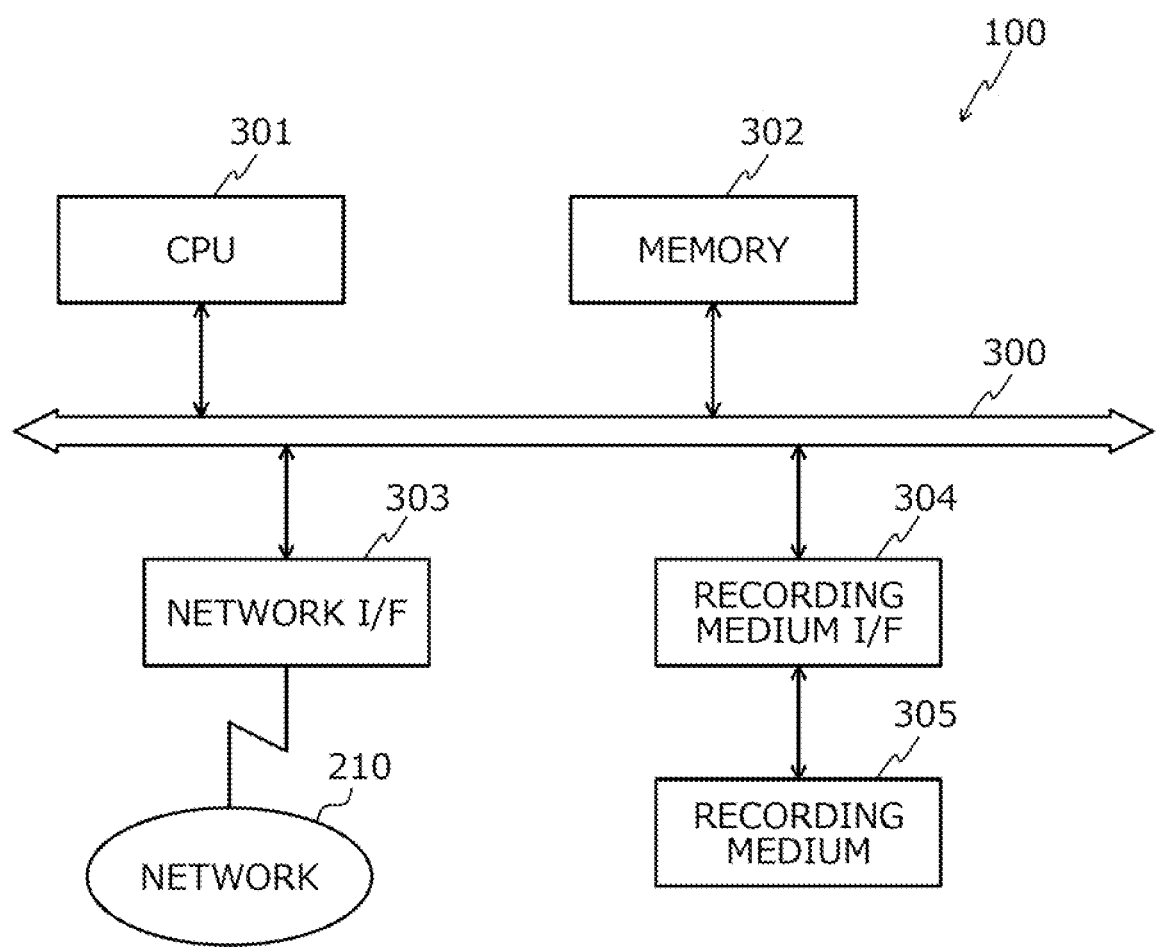
FIG. 3 is a block diagram illustrating a hardware configuration example of an information processing device 100.

FIG. 3 is a block diagram illustrating a hardware configuration example of the information processing device 100. In FIG. 3, the information processing device 100 includes a central processing unit (CPU) 301, a memory 302, a network interface (I/F) 303, a recording medium I/F 304, and a recording medium 305. Furthermore, the individual constituent members are connected to each other by a bus 300.

Here, the CPU 301 is in charge of overall control of the information processing device 100. For example, the memory 302 includes a read only memory (ROM), a random access memory (RAM), a flash ROM, and the like. Precisely, for example, the flash ROM or the ROM stores various programs, and the RAM is used as a work area for the CPU 301. The programs stored in the memory 302 are loaded into the CPU 301 to cause the CPU 301 to execute coded processing.

The network I/F 303 is connected to the network 210 through a communication line and is connected to another computer via the network 210. Then, the network I/F 303 is in charge of an interface between the network 210 and the inside and controls input and output of data from another computer. For example, the network I/F 303 is a modem, a LAN adapter, or the like.

The recording medium I/F 304 controls reading and writing of data from and to the recording medium 305 under the control of the CPU 301. For example, the recording medium I/F 304 is a disk drive, a solid state drive (SSD), a universal serial bus (USB) port, or the like. The recording medium 305 is a nonvolatile memory that stores data written under the control of the recording medium I/F 304. For example, the recording medium 305 is a disk, a semiconductor memory, a USB memory, or the like. The recording medium 305 may be attachable to and detachable from the information processing device 100.

For example, the information processing device 100 may include a keyboard, a mouse, a display, a printer, a scanner, a microphone, a speaker, or the like in addition to the constituent members described above. Furthermore, the information processing device 100 may include a plurality of the recording medium I/Fs 304 and the recording medium 305. In addition, the information processing device 100 does not have to include the recording medium I/F 304 or the recording medium 305.

(Hardware Configuration Example of Terminal Device 201)

Precisely, since the hardware configuration example of the terminal device 201 is similar to the hardware configuration example of the information processing device 100 illustrated in FIG. 3, the description thereof will be omitted.

(Functional Configuration Example of Information Processing Device 100)

Next, a functional configuration example of the information processing device 100 will be described with reference to FIG. 4.

Figure 4:
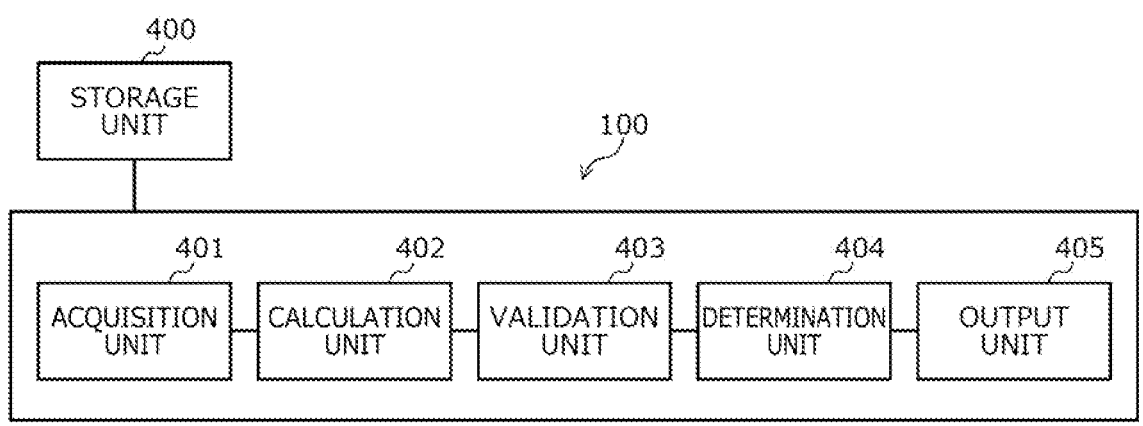
FIG. 4 is a block diagram illustrating a functional configuration example of the information processing device 100.

FIG. 4 is a block diagram illustrating a functional configuration example of the information processing device 100. The information processing device 100 includes a storage unit 400, an acquisition unit 401, a calculation unit 402, a validation unit 403, a determination unit 404, and an output unit 405.

The storage unit 400 is implemented by a storage area of the memory 302, the recording medium 305, or the like illustrated in FIG. 3, for example. Hereinafter, a case where the storage unit 400 is included in the information processing device 100 will be described. However, the storage unit 400 is not limited to this case. For example, there may be a case where the storage unit 400 is included in a device different from the information processing device 100, and the information processing device 100 is allowed to refer to the stored contents of the storage unit 400.

The acquisition unit 401 to the output unit 405 function as an example of a control unit. Precisely, for example, the acquisition unit 401 to the output unit 405 implement functions thereof by causing the CPU 301 to execute a program stored in a storage area of the memory 302, the recording medium 305, or the like or by the network I/F 303 illustrated in FIG. 3. A processing result of each functional unit is stored in a storage area of the memory 302, the recording medium 305, or the like illustrated in FIG. 3, for example.

The storage unit 400 stores various sorts of information to be referred to or updated in the processing of each functional unit. The storage unit 400 stores time-series data. The time-series data is, for example, assigned as an analysis target. The time-series data indicates a temporal change in some feature amount. For example, the feature amount is a traffic amount, a communication delay amount, or the like. The time-series data has some attribute, for example. The attributes of the time-series data include, for example, a network address. The attributes of the time-series data include, for example, the uniform resource locator (URL) hierarchy of the hypertext transfer protocol (HTTP) command. The time-series data is acquired by the acquisition unit 401 and stored by the storage unit 400, for example.

The storage unit 400 stores a plurality of unit candidates that can be set as the unit of aggregation. The unit of aggregation allows to specify which piece of time-series data among the plurality of pieces of the time-series data is to be aggregated. The unit of aggregation defines, for example, a range of network addresses. The unit of aggregation allows to specify a group of time-series data to be aggregated into one piece of the aggregated time-series data, for example, by defining a range of network addresses.

The aggregated time-series data indicates, for example, a temporal change in statistic of some feature amount. For example, the statistic is a maximum value, a minimum value, an average value, a median value, a mode value, a variance, or the like. The statistic of the traffic amount is, for example, a maximum traffic amount. The statistic of the communication delay amount is, for example, an average communication delay amount. The storage unit 400 stores, for example, a plurality of candidates for a range of network addresses that can be set as the unit of aggregation. For example, the storage unit 400 may store a plurality of candidates that gradually become wider. One candidate may include, for example, a plurality of other candidates.

The unit of aggregation defines, for example, the number of pieces of the time-series data to be aggregated. The unit of aggregation allows to specify a group of time-series data to be aggregated into one piece of the aggregated time-series data by defining the number of pieces of the time-series data to be aggregated. The storage unit 400 stores, for example, a plurality of candidates for the number of pieces of the time-series data to be aggregated into one piece of the aggregated time-series data, which can be set as the unit of aggregation.

The unit of aggregation defines, for example, the depth of the URL hierarchy. The unit of aggregation allows to specify a group of time-series data to be aggregated into one piece of the aggregated time-series data, for example, by defining the depth of the URL hierarchy. The storage unit 400 stores, for example, a plurality of candidates for the depth of the URL hierarchy that can be set as the unit of aggregation. For example, the storage unit 400 may store a plurality of candidates that gradually become deeper. One candidate may be deeper than the other candidates, for example.

The unit of aggregation may define, for example, the data amount of time-series data to be aggregated. The unit of aggregation allows to specify a group of time-series data to be aggregated into one piece of the aggregated time-series data by defining the data amount of time-series data to be aggregated. The storage unit 400 stores, for example, a plurality of candidates for the data amount of time-series data to be aggregated into one piece of the aggregated time-series data, which can be set as the unit of aggregation. The unit of aggregation is preset, for example, by the administrator. The unit of aggregation may be acquired by the acquisition unit 401 and stored by the storage unit 400, for example.

The storage unit 400 stores the predetermined condition. The predetermined condition is set for an index value relating to periodicity at a predetermined time interval in aggregated time-series data in which one or more pieces of the time-series data are aggregated. The predetermined time interval is, for example, a preset time interval with a particular period of time. The index value is calculated based on, for example, a difference between the aggregated time-series data and the aggregated time-series data shifted by a particular period of time in the time axis direction. For example, the stronger the periodicity, the greater value the index value has. The index value has a greater value as the difference between the aggregated time-series data and the aggregated time-series data shifted by a particular period of time in the time axis direction becomes smaller, for example.

The predetermined condition is, for example, a condition that the calculated index value is equal to or higher than a predetermined threshold value. For example, the predetermined condition is a condition indicating that the periodicity is equal to or stronger than a particular level. The predetermined condition is preset, for example, by the administrator. The predetermined condition may be acquired by the acquisition unit 401 and stored by the storage unit 400, for example.

The acquisition unit 401 acquires various sorts of information to be used for the processing of each functional unit. The acquisition unit 401 stores the acquired various sorts of information in the storage unit 400 or outputs the acquired various sorts of information to each functional unit. Furthermore, the acquisition unit 401 may output the various sorts of information stored in the storage unit 400 to each functional unit. The acquisition unit 401 acquires the various sorts of information based on, for example, an operation input by the administrator. The acquisition unit 401 may receive the various sorts of information from a device different from the information processing device 100, for example.

The acquisition unit 401 acquires a plurality of pieces of time-series data. The acquisition unit 401 acquires the plurality of pieces of time-series data, for example, by receiving the plurality of pieces of time-series data from one or more terminal devices 201. The respective pieces of the time-series data are, for example, data relating to different users. The respective pieces of the time-series data may be, for example, data relating to different parts of some system. Each piece of the time-series data is, for example, data indicating a temporal change in the same type of feature amount. The acquisition unit 401 may acquire the unit of aggregation. The acquisition unit 401 acquires the unit of aggregation by accepting the input of the unit of aggregation based on an operation input by the administrator, for example.

The acquisition unit 401 may accept a start trigger to start the processing of any one of the functional units. The start trigger is, for example, a predetermined operation input made by the administrator. The start trigger may be, for example, the receipt of predetermined information from another computer. The start trigger may be, for example, the output of predetermined information by any one of the functional units. For example, the acquisition unit 401 may accept the acquisition of a plurality of pieces of the time-series data as a start trigger to start the processing of the calculation unit 402, the validation unit 403, and the determination unit 404.

The calculation unit 402 calculates the index value relating to the periodicity at a predetermined time interval for each piece of the aggregated time-series data among one or more pieces of the aggregated time-series data obtained by dividing and aggregating the acquired plurality of pieces of the time-series data in accordance with a predetermined unit of aggregation. The predetermined unit of aggregation is set to the minimum unit of aggregation in the initial state, for example. For example, the predetermined unit of aggregation may be set to a unit other than the minimum unit of aggregation in the initial state. For example, the predetermined unit of aggregation may be set to the maximum unit of aggregation in the initial state. For example, the predetermined unit of aggregation may be set to a random unit of aggregation in the initial state.

For example, the calculation unit 402 generates one or more pieces of aggregated time-series data by dividing and aggregating the acquired plurality of pieces of the time-series data in accordance with a predetermined unit of aggregation. For example, the calculation unit 402 calculates an index value relating to periodicity at a predetermined time interval for each piece of the aggregated time-series data among the generated one or more pieces of the aggregated time-series data.

For example, the calculation unit 402 generates aggregated time-series data in which one or more pieces of time-series data corresponding to the range of network addresses set as the unit of aggregation are aggregated from among the acquired plurality of pieces of the time-series data. For example, the calculation unit 402 calculates the index value relating to the periodicity at a predetermined time interval for the generated aggregated time-series data. This allows the calculation unit 402 to obtain an index value as a guideline for validating whether or not the unit of aggregation is appropriate. Furthermore, the calculation unit 402 may be applied to a situation in which the network address is included in the attributes of the time-series data.

For example, the calculation unit 402 generates aggregated time-series data in which a number of pieces of time-series data equal to the number set as the unit of aggregation are aggregated from among the acquired plurality of pieces of the time-series data. For example, the calculation unit 402 calculates the index value relating to the periodicity at a predetermined time interval for the generated aggregated time-series data. This allows the calculation unit 402 to obtain an index value as a guideline for validating whether or not the unit of aggregation is appropriate. Furthermore, the calculation unit 402 may obtain an index value as a guideline for validating whether or not the unit of aggregation is appropriate, regardless of the attributes of the time-series data, for example.

For example, the calculation unit 402 generates aggregated time-series data in which one or more pieces of time-series data corresponding to the depth of the URL hierarchy set as the unit of aggregation are aggregated from among the acquired plurality of pieces of the time-series data. For example, the calculation unit 402 calculates the index value relating to the periodicity at a predetermined time interval for the generated aggregated time-series data. This allows the calculation unit 402 to obtain an index value as a guideline for validating whether or not the unit of aggregation is appropriate. Furthermore, the calculation unit 402 may be applied to a situation in which the URL hierarchy is included in the attributes of the time-series data.

Each time the predetermined unit of aggregation is altered, the calculation unit 402 calculates the index value for each piece of the aggregated time-series data among the one or more pieces of the aggregated time-series data obtained by dividing and aggregating the plurality of pieces of the time-series data in accordance with the predetermined unit of aggregation after the alteration. This allows the calculation unit 402 to obtain an index value as a guideline for validating whether or not the unit of aggregation is appropriate, for each unit of aggregation among the plurality of units of aggregation. Therefore, the calculation unit 402 may make it easy to find an appropriate unit of aggregation.

There may be a case where the calculation unit 402 calculates the index value for each piece of the aggregated time-series data among the one or more pieces of the aggregated time-series data in each unit of aggregation among the plurality of units of aggregation at a time. This allows the calculation unit 402 to obtain an index value as a guideline for validating whether or not the unit of aggregation is appropriate, for each unit of aggregation among the plurality of units of aggregation. Therefore, the calculation unit 402 may make it easy to find an appropriate unit of aggregation.

The validation unit 403 validates whether or not the calculated index value satisfies the predetermined condition. The validation unit 403 validates, for example, whether or not the calculated index value is equal to or higher than a predetermined threshold value. This allows the validation unit 403 to validate whether or not the periodicity of the aggregated time-series data is relatively strong and to make it possible to validate which unit of aggregation is appropriate and which unit of aggregation the aggregated time-series data preferably has when determined as an analysis target.

The validation unit 403 may alter the predetermined unit of aggregation based on the result of the validation. Here, it is conceivable that the predetermined unit of aggregation is set to the minimum unit of aggregation in the initial state. In response to this, when the calculated index value does not satisfy the predetermined condition, the validation unit 403 alters the predetermined unit of aggregation such that the predetermined unit of aggregation becomes greater. This allows the validation unit 403 to validate whether or not the calculated index value satisfies the predetermined condition with respect to each unit of aggregation while increasing the predetermined unit of aggregation in an order from the minimum unit of aggregation. Therefore, the validation unit 403 may make it possible to specify a minimum unit of aggregation that corresponds to the index value that satisfies the predetermined condition, from among the plurality of units of aggregation. Accordingly, the validation unit 403 may make it easy to find an appropriate unit of aggregation and may reduce the processing load imposed when finding an appropriate unit of aggregation.

Here, it is conceivable that the predetermined unit of aggregation is set to the maximum unit of aggregation in the initial state. In response to this, while the calculated index value satisfies the predetermined condition, the validation unit 403 alters the predetermined unit of aggregation such that the predetermined unit of aggregation becomes smaller until the predetermined condition is no longer satisfied. In consequence, the validation unit 403 may allow to specify a minimum unit of aggregation that corresponds to the index value that satisfies the predetermined condition, from among the plurality of units of aggregation, and thus may make it easy to find an appropriate unit of aggregation.

Here, it is conceivable that the predetermined unit of aggregation is randomly set. In response to this, when the calculated index value does not satisfy the predetermined condition, the validation unit 403 alters the predetermined unit of aggregation such that the predetermined unit of aggregation becomes greater. Furthermore, the validation unit 403 may randomly alter the predetermined unit of aggregation when the calculated index value does not satisfy the predetermined condition. This allows the validation unit 403 to validate whether or not the calculated index value satisfies the predetermined condition with respect to each unit of aggregation among the plurality of units of aggregation. Therefore, the validation unit 403 may make it possible to specify a minimum unit of aggregation that corresponds to the index value that satisfies the predetermined condition, from among the plurality of units of aggregation. Accordingly, the validation unit 403 may make it easy to find an appropriate unit of aggregation and may reduce the processing load imposed when finding an appropriate unit of aggregation.

When the calculated index value satisfies the predetermined condition, the determination unit 404 determines each piece of the aggregated time-series data as an analysis target. For example, when all of the index values calculated with respect to a certain unit of aggregation satisfy the predetermined condition, the determination unit 404 validates the certain unit of aggregation to be appropriate and determines each piece of the aggregated time-series data in the certain unit of aggregation, as an analysis target. For example, when all of the index values calculated with respect to a certain unit of aggregation are equal to or higher than a predetermined threshold value, the determination unit 404 validates the certain unit of aggregation to be appropriate and determines each piece of the aggregated time-series data in the certain unit of aggregation, as an analysis target. This allows the determination unit 404 to find an appropriate unit of aggregation and to determine the aggregated time-series data in the appropriate unit of aggregation as an analysis target.

For example, when at least one of the index values calculated with respect to a certain unit of aggregation satisfy the predetermined condition, the determination unit 404 validates the certain unit of aggregation to be appropriate and determines each piece of the aggregated time-series data in the certain unit of aggregation, as an analysis target. For example, when at least one of the index values calculated with respect to a certain unit of aggregation is equal to or higher than a predetermined threshold value, the determination unit 404 validates the certain unit of aggregation to be appropriate and determines each piece of the aggregated time-series data in the certain unit of aggregation, as an analysis target. This allows the determination unit 404 to find an appropriate unit of aggregation and to determine the aggregated time-series data in the appropriate unit of aggregation as an analysis target.

Here, for example, when the calculated index value did not satisfy the predetermined condition, a case where the validation unit 403 has altered the predetermined unit of aggregation such that the predetermined unit of aggregation becomes greater is conceivable. In this case, the determination unit 404 selects a unit of aggregation whose calculated index value satisfies the predetermined condition and which has been first found, as an appropriate unit of aggregation, and determines the aggregated time-series data in the selected unit of aggregation, as an analysis target. This allows the determination unit 404 to find an appropriate unit of aggregation.

Here, for example, when the calculated index value did not satisfy the predetermined condition, a case where the validation unit 403 has altered the predetermined unit of aggregation such that the predetermined unit of aggregation becomes smaller is conceivable. In this case, the determination unit 404 selects, as an appropriate unit of aggregation, a minimum unit of aggregation among units of aggregation whose calculated index values satisfy the predetermined condition, from among the plurality of units of aggregation, and determines the aggregated time-series data in the selected unit of aggregation, as an analysis target. This allows the determination unit 404 to find an appropriate unit of aggregation.

Here, for example, a case where the validation unit 403 has altered the predetermined unit of aggregation such that the predetermined unit of aggregation becomes smaller until the calculated index value no longer satisfies the predetermined condition is conceivable. In this case, the determination unit 404 selects, as an appropriate unit of aggregation, a minimum unit of aggregation among units of aggregation whose calculated index values satisfy the predetermined condition, from among the plurality of units of aggregation, and determines the aggregated time-series data in the selected unit of aggregation, as an analysis target. This allows the determination unit 404 to find an appropriate unit of aggregation.

Here, for example, when the predetermined unit of aggregation was randomly set and the calculated index value did not satisfy the predetermined condition, a case where the validation unit 403 has altered the predetermined unit of aggregation such that the predetermined unit of aggregation becomes greater is conceivable. In this case, the determination unit 404 selects a unit of aggregation whose calculated index value satisfies the predetermined condition and which has been first found, as an appropriate unit of aggregation, and determines the aggregated time-series data in the selected unit of aggregation, as an analysis target. This allows the determination unit 404 to find an appropriate unit of aggregation.

Here, for example, a case where the calculation unit 402 has calculated the index value for each piece of the aggregated time-series data among the one or more pieces of the aggregated time-series data in each unit of aggregation among the plurality of units of aggregation at a time is conceivable. In this case, the determination unit 404 selects, as an appropriate unit of aggregation, a minimum unit of aggregation among units of aggregation whose calculated index values satisfy the predetermined condition, from among the plurality of units of aggregation, and determines the aggregated time-series data in the selected unit of aggregation, as an analysis target. This allows the determination unit 404 to find an appropriate unit of aggregation.

The determination unit 404 performs predetermined analysis processing on each piece of the aggregated time-series data determined as an analysis target. For example, the analysis is detection of an anomaly or the like relating to some system. For example, the determination unit 404 performs detection of an anomaly relating to some system, based on each piece of the aggregated time-series data determined as an analysis target. For example, the determination unit 404 specifies a normal range that the statistic of the feature amount can take, by applying a statistical approach to each piece of the aggregated time-series data. Then, the determination unit 404 performs detection of an anomaly relating to some system, based on whether or not the actually measured value of the statistic of the feature amount deviates from the specified normal range in each piece of the aggregated time-series data, for example. This allows the determination unit 404 to accurately perform the predetermined analysis processing.

The output unit 405 outputs a processing result of at least any one of the functional units. An output format is, for example, display on a display, print output to a printer, transmission to an external device by the network I/F 303, or storage in a storage area of the memory 302, the recording medium 305, or the like. In consequence, the output unit 405 allows to notify the administrator of the processing result of at least any one of the functional units and may promote improvement in the convenience of the information processing device 100.

The output unit 405 outputs the appropriate unit of aggregation. The output unit 405 outputs the appropriate unit of aggregation in a manner that allows the administrator to grasp the appropriate unit of aggregation, for example. The output unit 405, for example, displays the appropriate unit of aggregation on a display in a manner that allows the administrator to grasp the appropriate unit of aggregation. In consequence, the output unit 405 may allow the administrator to accurately perform analysis processing based on a plurality of pieces of the time-series data, based on the appropriate unit of aggregation.

The output unit 405 outputs the aggregated time-series data in the appropriate unit of aggregation. The output unit 405 outputs the aggregated time-series data in the appropriate unit of aggregation in a manner that allows the administrator to grasp the aggregated time-series data, for example. The output unit 405, for example, displays the aggregated time-series data in the appropriate unit of aggregation on a display in a manner that allows the administrator to grasp the aggregated time-series data. For example, the output unit 405 may display the aggregated time-series data in the appropriate unit of aggregation on a display in association with the appropriate unit of aggregation in a manner that allows the administrator to grasp the aggregated time-series data. In consequence, the output unit 405 may allow the administrator to accurately perform the analysis processing, based on the aggregated time-series data in the appropriate unit of aggregation obtained from the plurality of pieces of the time-series data.

The output unit 405 outputs the result of performing the analysis processing. The output unit 405 outputs the result of performing the analysis processing in a manner that allows the administrator to grasp the result, for example. The output unit 405, for example, displays the result of performing the analysis processing on a display in a manner that allows the administrator to grasp the result. In consequence, the output unit 405 may allow the administrator to grasp the analysis processing based on the plurality of pieces of the time-series data.

(Flow of Action of Information Processing Device 100)

Next, a flow of an action of the information processing device 100 will be described with reference to FIG. 5.

Figure 5:
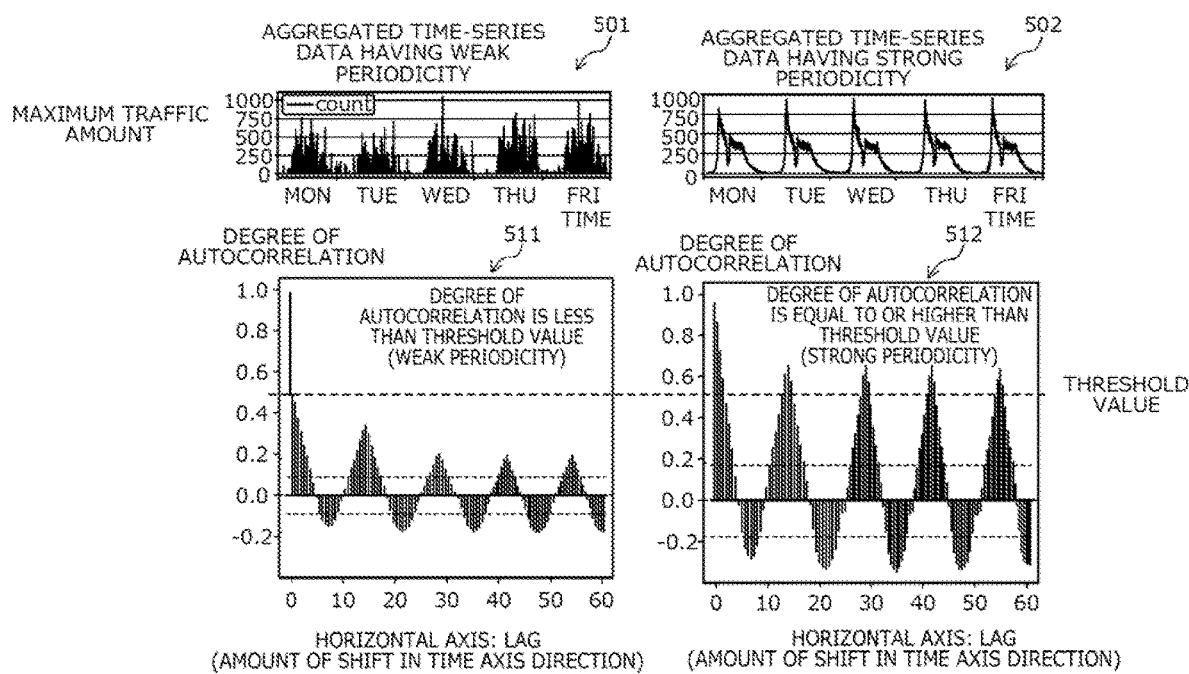
FIG. 5 is an explanatory diagram illustrating a flow of an action of the information processing device 100.

FIG. 5 is an explanatory diagram illustrating a flow of an action of the information processing device 100. In FIG. 5, the time-series data indicates the traffic amount at each time point. The aggregated time-series data obtained by aggregating one or more pieces of the time-series data indicates the maximum traffic amount at each time point. The maximum traffic amount corresponds to the maximum value in the traffic amounts indicated by the pieces of time-series data that have been aggregated.

The information processing device 100 calculates a daily degree of autocorrelation as an index value relating to periodicity of the maximum traffic amount in the aggregated time-series data in a certain unit of aggregation. The degree of autocorrelation is, for example, the degree of similarity between one piece of aggregated time-series data and another piece of aggregated time-series data obtained by shifting the one piece of aggregated time-series data by a certain amount in the time axis direction. In the following description, the amount of shift of the aggregated time-series data in the time axis direction is sometimes called "lag".

As illustrated in FIG. 5, the change in the degree of autocorrelation relative to the change in the lag in aggregated time-series data 501 having a relatively weak periodicity is given as the change indicated by a graph 511. As indicated by the graph 511, the aggregated time-series data 501, which has a relatively weak periodicity, tends to have a relatively small degree of autocorrelation. The reason why the degree of autocorrelation around zero of the lag is relatively great is not because the periodicity is strong, and it is thus preferable to treat the degree of autocorrelation around zero of the lag as not meaning the strength of periodicity.

On the other hand, as illustrated in FIG. 5, the change in the degree of autocorrelation relative to the change in the lag in aggregated time-series data 502 having a relatively strong periodicity is given as the change indicated by a graph 512. As indicated by the graph 512, the aggregated time-series data 502, which has a relatively strong periodicity, tends to have a relatively great degree of autocorrelation. The reason why the degree of autocorrelation around zero of the lag is relatively great is not because the periodicity is strong, and it is thus preferable to treat the degree of autocorrelation around zero of the lag as not meaning the strength of periodicity.

Therefore, it is preferable for the information processing device 100 to calculate the degree of autocorrelation except around zero of the lag when calculating the daily degree of autocorrelation in the aggregated time-series data in a certain unit of aggregation. For example, the information processing device 100 calculates the degree of autocorrelation for each lag while slowly increasing the lag and then adopts the maximum degree of autocorrelation except around zero of the lag, as the daily degree of autocorrelation in the aggregated time-series data. A specific example in which the information processing device 100 calculates the degree of autocorrelation will be described later with reference to FIGS. 10 to 13, for example.

Here, it will be indicated that the greater the degree of autocorrelation, the stronger the periodicity of the maximum traffic amount and the greater the statistical multiplexing effect. The relationship between the degree of autocorrelation and the statistical multiplexing effect will be precisely described later with reference to, for example, FIG. 9. If the calculated degree of autocorrelation is equal to or higher than a predetermined threshold value with respect to a certain unit of aggregation, the information processing device 100 validates the periodicity to be equal to or stronger than a particular level and the statistical multiplexing effect to be relatively great and validates the certain unit of aggregation to be appropriate. The information processing device 100 performs detection of an anomaly in a system based on the aggregated time-series data in the appropriate unit of aggregation.

For example, the information processing device 100 repeats to verify whether or not the daily degree of autocorrelation in the aggregated time-series data in the unit of aggregation is equal to or higher than a predetermined threshold value, while increasing the unit of aggregation in an order from the minimum unit of aggregation until the degree of autocorrelation becomes equal to or higher than the predetermined threshold value. Then, for example, the information processing device 100 validates the unit of aggregation whose degree of autocorrelation has first become equal to or higher than the predetermined threshold value to be appropriate. For example, the information processing device 100 performs detection of an anomaly in a system based on the aggregated time-series data in the appropriate unit of aggregation. This allows the information processing device 100 to accurately perform detection of an anomaly in a system in line with the appropriate unit of aggregation.

(Example of Action of Information Processing Device 100)

Next, an example of an action of the information processing device 100 will be described with reference to FIGS. 6 to 8.

Figure 6:
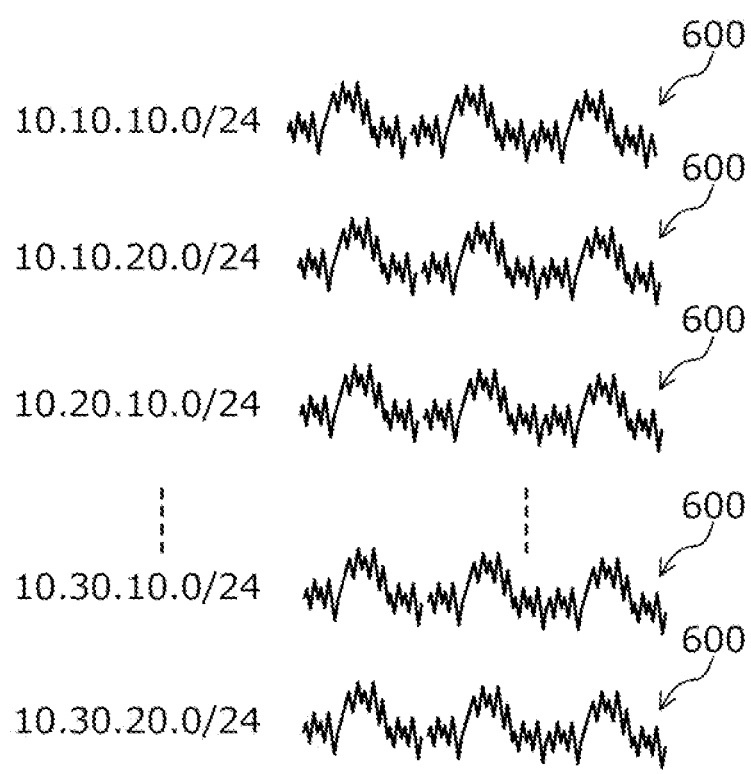
FIG. 6 is an explanatory diagram (part 1) illustrating an example of an action of the information processing device 100.
Figure 7:
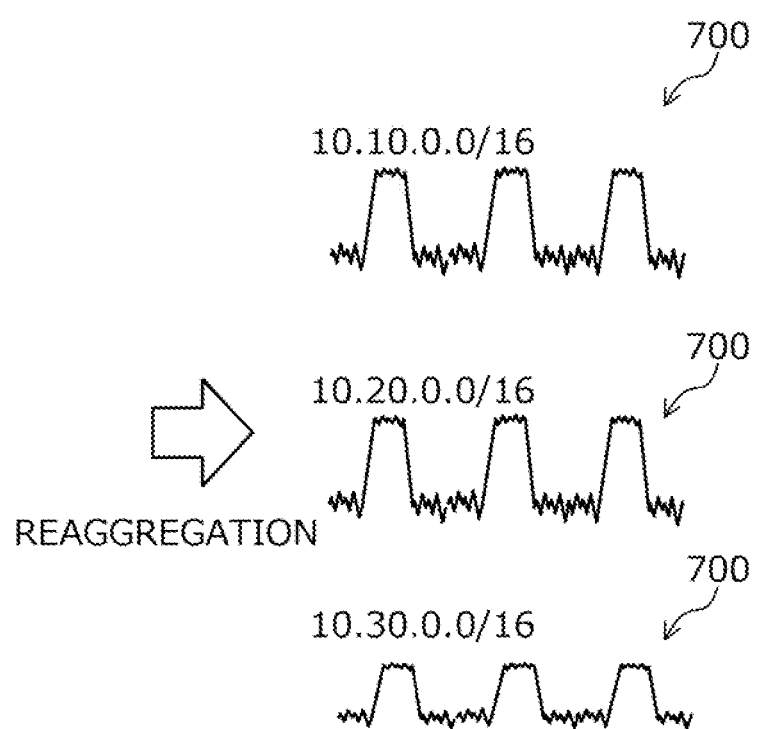
FIG. 7 is an explanatory diagram (part 2) illustrating an example of an action of the information processing device 100.
Figure 8:
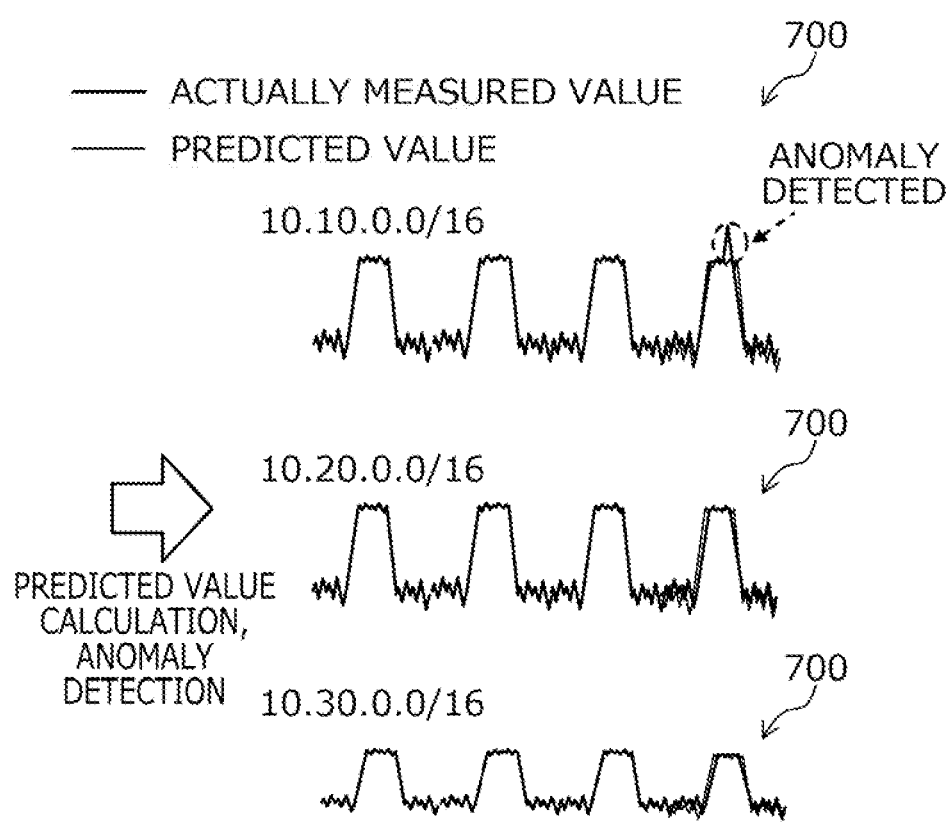
FIG. 8 is an explanatory diagram (part 3) illustrating an example of an action of the information processing device 100.

FIGS. 6 to 8 are explanatory diagrams illustrating an example of an action of the information processing device 100. In FIG. 6, it is assumed that the information processing device 100 has acquired a plurality of pieces of time-series data. The time-series data indicates the traffic amount at each time point. Each piece of the time-series data is in units of users. It is assumed that the attributes of the time-series data include the network address.

It is assumed that the initial value of the unit of aggregation is the mask "/24" of the network address. The mask "/n" indicates that the values of the upper n digits of the network address are fixed. The element n denotes an integer. The numeral "0" contained in the network address indicates the range from 1 to 254.

(6-1) The information processing device 100 aggregates the time-series data in units of users in accordance with the mask "/24" of the network address and generates aggregated time-series data 600. The aggregated time-series data 600 indicates the maximum traffic amount at each time point. For example, the aggregated time-series data 600 in which time-series data of the network address "10.10.10.0/24" is aggregated, the aggregated time-series data 600 in which time-series data of the network address "10.10.20.0/24" is aggregated, and the like are generated.

(6-2) The information processing device 100 calculates the degree of autocorrelation in each piece of the aggregated time-series data 600 and verifies whether or not the calculated degree of autocorrelation is equal to or higher than a predetermined threshold value. In the example in FIG. 6, the information processing device 100 verifies the degree of autocorrelation in at least one piece of the aggregated time-series data 600 to be less than the predetermined threshold value and validates the mask "/24" of the network address not to be an appropriate unit of aggregation.

This allows the information processing device 100 to avoid performing detection of an anomaly using the aggregated time-series data 600 in which the unit of aggregation is not appropriate and the statistical multiplexing effect is relatively small. Therefore, the information processing device 100 may promote improvement in the accuracy of anomaly detection. Next, description of FIG. 7 will be made.

In FIG. 7, (7-1) the information processing device 100 alters the unit of aggregation such that the unit of aggregation becomes greater because the degree of autocorrelation in at least one piece of the aggregated time-series data 600 is less than the predetermined threshold value. In the example in FIG. 7, the information processing device 100 alters the unit of aggregation to the mask "/16" of the network address.

(7-2) The information processing device 100 aggregates the time-series data in units of users in accordance with the mask "/16" of the network address and generates aggregated time-series data 700. The aggregated time-series data 700 indicates the maximum traffic amount at each time point. For example, the aggregated time-series data 700 in which time-series data of the network address "10.10.0.0/16" is aggregated, the aggregated time-series data 700 in which time-series data of the network address "10.20.0.0/16" is aggregated, and the like are generated.

(7-3) The information processing device 100 calculates the degree of autocorrelation in each piece of the aggregated time-series data 700 and verifies whether or not the calculated degree of autocorrelation is equal to or higher than the predetermined threshold value. In the example in FIG. 7, the information processing device 100 verifies the degree of autocorrelation in all pieces of the aggregated time-series data 700 to be equal to or higher than the predetermined threshold value and validates the mask "/16" of the network address to be an appropriate unit of aggregation. Furthermore, if the degree of autocorrelation in at least one piece of the aggregated time-series data 700 is less than the predetermined threshold value, the information processing device 100 may validate the unit of aggregation not to be appropriate and alter the unit of aggregation to perform an action similar to the action in FIG. 7 again. Next, description of FIG. 8 will be made.

In FIG. 8, (8-1) the information processing device 100 performs anomaly detection based on each piece of the aggregated time-series data 700. The information processing device 100 specifies a change in the predicted value of the maximum traffic amount by applying a statistical approach to the aggregated time-series data 700, for example. In the example in FIG. 8, the predicted values are indicated by thin lines.

Then, the information processing device 100 validates that an anomaly has occurred, for example, when the actually measured value of the maximum traffic amount indicated by the aggregated time-series data 700 diverges from the predicted value by a particular amount or more. In the example in FIG. 8, the actually measured values are indicated by thick lines. In the example in FIG. 8, the information processing device 100 validates that an anomaly has occurred, in regard to the aggregated time-series data 700 in which the time-series data of the network address "10.10.0.0/16" is aggregated. For example, the information processing device 100 validates that an anomaly has occurred at a part corresponding to the network address "10.10.0.0/16".

(8-2) When it is validated that an anomaly has occurred, the information processing device 100 outputs the network address "10.10.0.0/16" in which an anomaly has occurred, in a manner that allows the administrator to grasp the network address. This allows the information processing device 100 to accurately perform anomaly detection. For example, the information processing device 100 may perform anomaly detection in a state in which the statistical multiplexing effect is relatively strong and may reduce the probability of erroneous anomaly detection. Furthermore, for example, the information processing device 100 may make the unit of aggregation relatively small and may make it easy to distinguish a part where an anomaly has occurred. In addition, the information processing device 100 may allow the administrator to grasp the result of performing anomaly detection.

Here, a case assuming that the information processing device 100 validates a certain unit of aggregation to be appropriate and performs the analysis processing based on the aggregated time-series data if the degree of autocorrelation in all pieces of the aggregated time-series data in the certain unit of aggregation is equal to or higher than a predetermined threshold value has been described, but the unit of aggregation is not limited to this case. For example, there may be a case where the information processing device 100 assigns aggregated time-series data whose degree of autocorrelation calculated in a certain unit of aggregation is equal to or higher than a predetermined threshold value, as an analysis target, and reaggregate aggregated time-series data whose calculated degree of autocorrelation is less than the predetermined threshold value, in a different unit of aggregation.

(Relationship Between Degree of Autocorrelation and Statistical Multiplexing Effect)

Next, a relationship between the degree of autocorrelation and the statistical multiplexing effect will be described with reference to FIG. 9.

Figure 9:
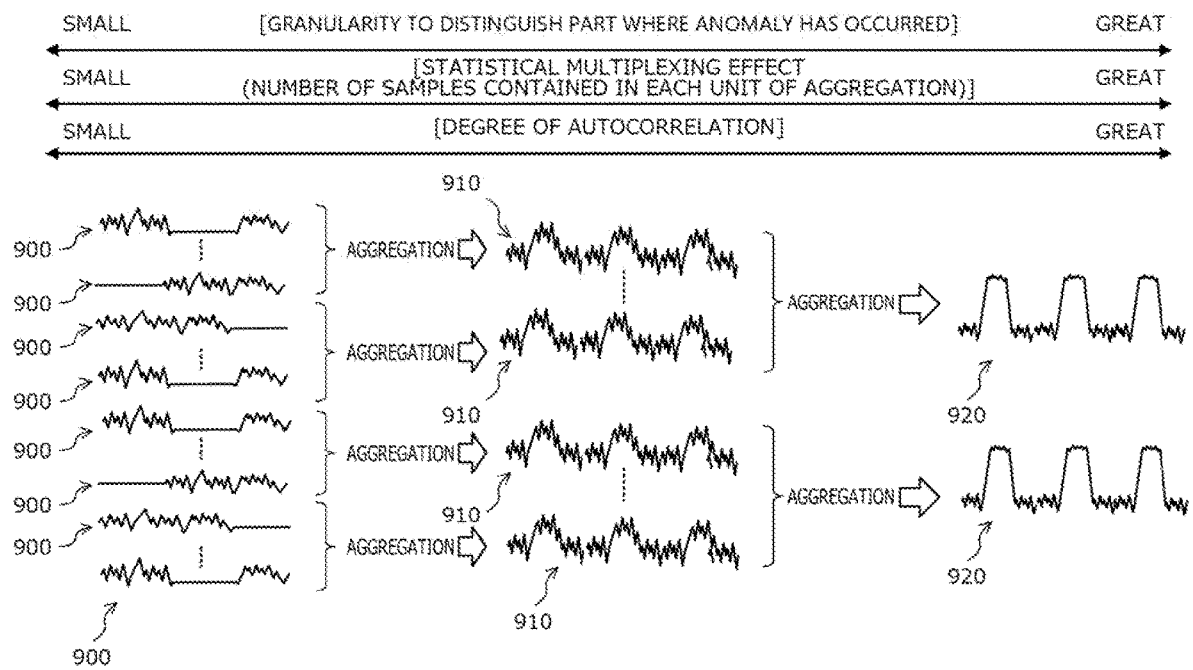
FIG. 9 is an explanatory diagram illustrating a relationship between the degree of autocorrelation and a statistical multiplexing effect.

FIG. 9 is an explanatory diagram illustrating a relationship between the degree of autocorrelation and the statistical multiplexing effect. In FIG. 9, aggregated time-series data 900 corresponds to a relatively small unit of aggregation and corresponds to a case where the number of pieces of the time-series data aggregated as samples into the aggregated time-series data 900 is relatively small. In this case, the property of the aggregated time-series data 900 is easily dominated by the behavior of individual users. The behavior corresponds to changes in traffic amount. For example, if the unit of aggregation is relatively small, the proportion of components corresponding to individual users in the aggregated time-series data 900 becomes relatively great.

For example, if there is a day when a user takes a vacation, the traffic amount on the day becomes zero, and a relatively great change is produced in the components included in the aggregated time-series data 900. For this reason, the aggregated time-series data 900 tends to have weaker periodicity of the maximum traffic amount and a smaller statistical multiplexing effect and also tends to have a smaller degree of autocorrelation.

Furthermore, aggregated time-series data 910 corresponds to a relatively great unit of aggregation as compared with the aggregated time-series data 900 and corresponds to a case where the number of pieces of the time-series data aggregated as samples into the aggregated time-series data 910 is relatively large. The aggregated time-series data 910 corresponds to, for example, the result of reaggregating two or more pieces of the aggregated time-series data 900. In this case, the property of the aggregated time-series data 910 is less likely to be dominated by the behavior of individual users as compared with the aggregated time-series data 900. For example, if the unit of aggregation is relatively great, the proportion of components corresponding to individual users in the aggregated time-series data 910 becomes relatively small.

Therefore, the aggregated time-series data 910 has been made to indicate macroscopic user behavior. For example, the aggregated time-series data 910 has been made to indicate statistical behavior such as the maximum traffic amount growing from about the work starting time and the maximum traffic amount dropping at about the work ending time, and the statistical multiplexing effect becomes relatively great. Accordingly, the aggregated time-series data 910 tends to have stronger periodicity of the maximum traffic amount and a greater statistical multiplexing effect and also tends to have a greater degree of autocorrelation.

Furthermore, aggregated time-series data 920 corresponds to a relatively great unit of aggregation and corresponds to a case where the number of pieces of the time-series data aggregated as samples into the aggregated time-series data 920 is relatively large. The aggregated time-series data 920 corresponds to, for example, the result of reaggregating two or more pieces of the aggregated time-series data 910. In this case, the property of the aggregated time-series data 920 is less likely to be dominated by the behavior of individual users. For example, if the unit of aggregation is relatively great, the proportion of components corresponding to individual users in the aggregated time-series data 920 becomes relatively small.

Therefore, the aggregated time-series data 920 has been made to indicate macroscopic user behavior. Accordingly, the aggregated time-series data 920 tends to have stronger periodicity of the maximum traffic amount and a greater statistical multiplexing effect and also tends to have a greater degree of autocorrelation. However, in the aggregated time-series data 920, it tends to be difficult to distinguish a part where an anomaly has occurred in anomaly detection. Since the number of pieces of time-series data that have been aggregated is relatively large, it is difficult to distinguish which piece of time-series data corresponds to a part where an anomaly has occurred.

From these facts, in order to improve the accuracy of anomaly detection, it is preferable to relatively increase the statistical multiplexing effect and reduce the probability of erroneously detecting a normal part as an anomaly, and additionally to make it easy to distinguish a part where an anomaly has occurred. For example, it is desirable to find an appropriate unit of aggregation such that the statistical multiplexing effect becomes relatively great and the number of pieces of the time-series data to be aggregated becomes relatively small.

In response to this, as described above in FIGS. 5 to 8, the information processing device 100 is enabled to find an appropriate unit of aggregation such that the statistical multiplexing effect becomes relatively great and the number of pieces of the time-series data to be aggregated becomes relatively small. Therefore, the information processing device 100 may accurately perform anomaly detection in line with an appropriate unit of aggregation.

(Example of Calculating Degree of Autocorrelation of Aggregated Time-Series Data)

Next, an example in which the information processing device 100 calculates the degree of autocorrelation of the aggregated time-series data will be described with reference to FIGS. 10 to 13.

Figure 10:
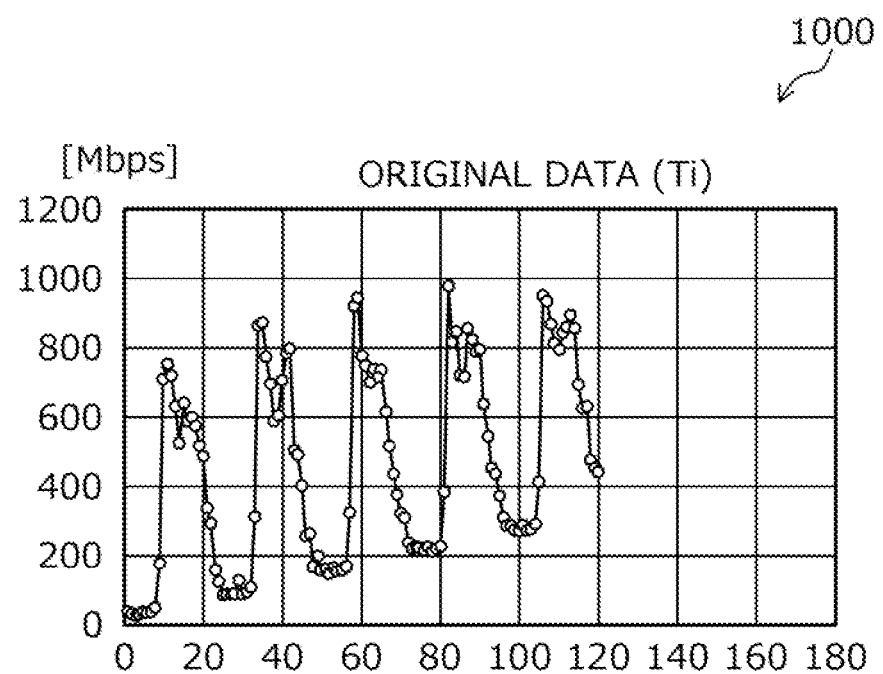
FIG. 10 is an explanatory diagram (part 1) illustrating an example of calculating the degree of autocorrelation of aggregated time-series data.

FIGS. 10 to 13 are explanatory diagrams illustrating an example of calculating the degree of autocorrelation of the aggregated time-series data. In FIG. 10, the information processing device 100 acquires aggregated time-series data (Ti) indicated by a graph 1000. The horizontal axis of the graph 1000 indicates the time point. The vertical axis of the graph 1000 indicates the traffic amount. Next, description of FIG. 11 will be made.

Figure 11:
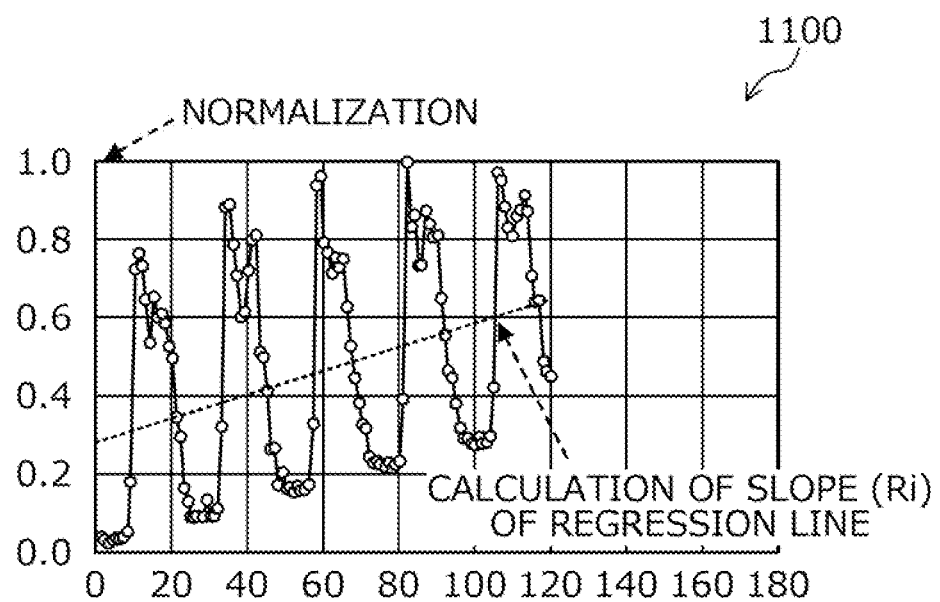
FIG. 11 is an explanatory diagram (part 2) illustrating an example of calculating the degree of autocorrelation of aggregated time-series data.

In FIG. 11, the information processing device 100 normalizes the aggregated time-series data (Ti) based on the maximum traffic amount in the aggregated time-series data (Ti) and generates normalized time-series data (N-Ti) indicated by a graph 1100. Then, the information processing device 100 calculates a slope (Ri) of the regression line in the normalized time-series data (N-Ti). Next, description of FIG. 12 will be made.

Figure 12:
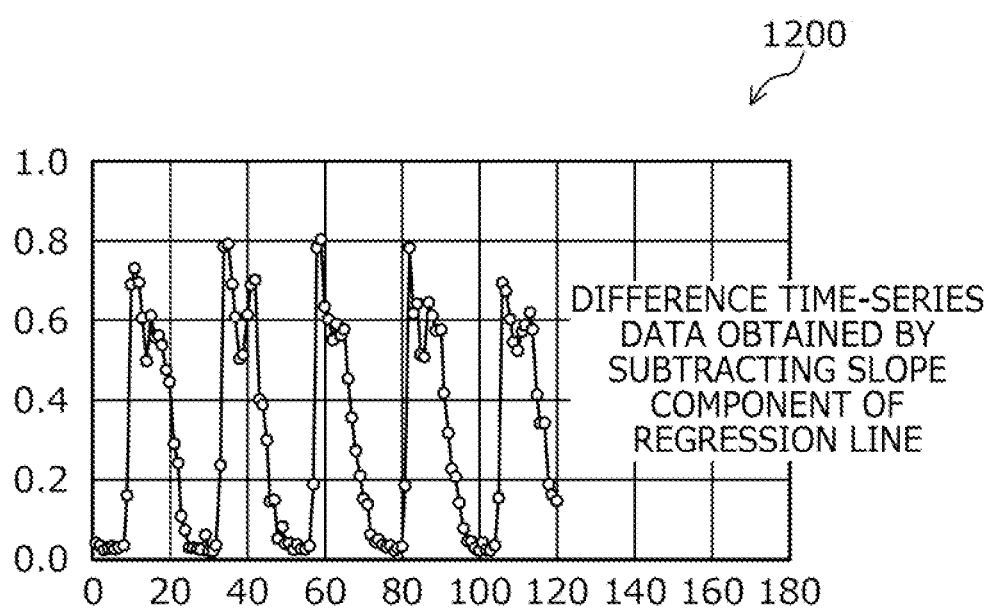
FIG. 12 is an explanatory diagram (part 3) illustrating an example of calculating the degree of autocorrelation of aggregated time-series data.

In FIG. 12, the information processing device 100 subtracts the slope component of the regression line from the normalized time-series data (N-Ti) to generate difference time-series data (D-Ti) indicated by a graph 1200. Next, description of FIG. 13 will be made.

Figure 13:
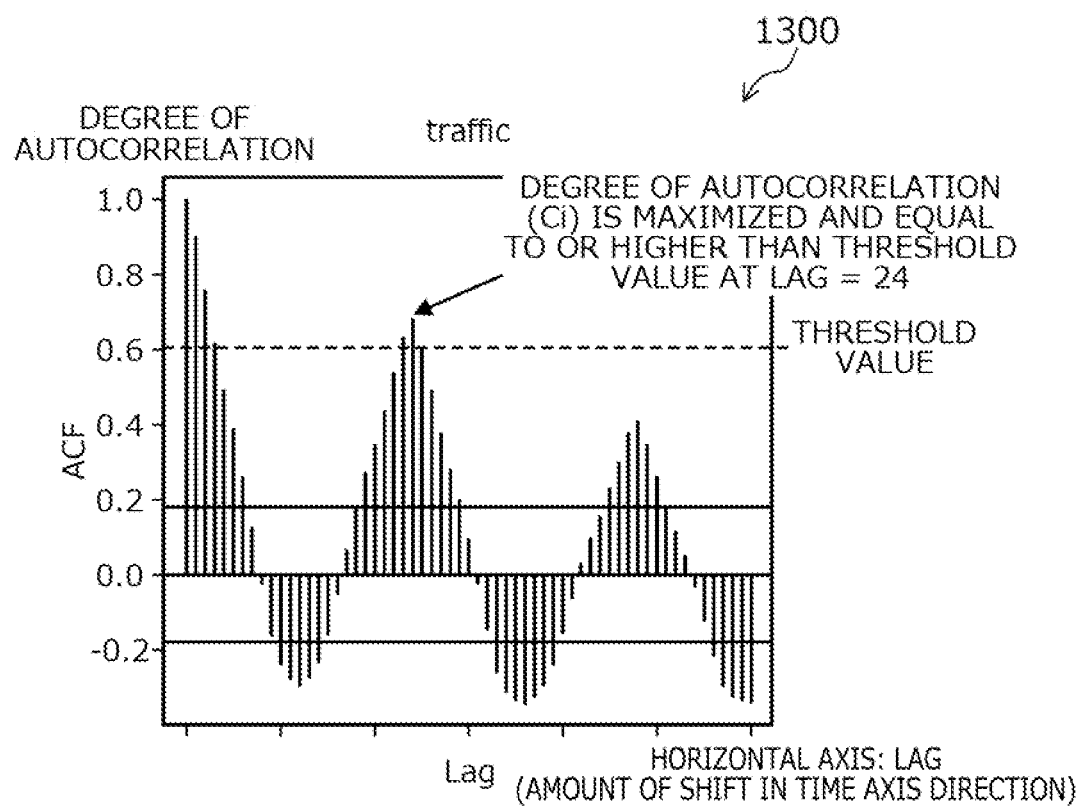
FIG. 13 is an explanatory diagram (part 4) illustrating an example of calculating the degree of autocorrelation of aggregated time-series data.

In FIG. 13, the information processing device 100 calculates the degree of autocorrelation (Ci) for each lag (Li) for the difference time-series data (D-Ti). For example, the information processing device 100 calculates, as the degree of autocorrelation (Ci), the degree of similarity between the difference time-series data (D-Ti) and adapted time-series data obtained by shifting the difference time-series data (D-Ti) by an amount equal to the lag, while changing the lag from zero in minute increments. The change in the degree of autocorrelation (Ci) relative to the change in the lag (Li) is indicated by a graph 1300.

The information processing device 100 specifies a lag (Li) at which the calculated degree of autocorrelation (Ci) is maximized in the difference time-series data (D-Ti). At this time, it is preferable for the information processing device 100 to specify the lag (Li) at which the degree of autocorrelation (Ci) of the difference time-series data (D-Ti) is maximized, except in the vicinity of the lag (Li)=0. The information processing device 100, for example, specifies the lag (Li) at which the degree of autocorrelation (Ci) is maximized, among the lags (Li) at which the degree of autocorrelation (Ci) is locally maximized, except the lag (Li) closest to the side of the lag (Li)=0.

The information processing device 100 specifies the lag (Li) at which the degree of autocorrelation (Ci) is maximized in a range wider than the lag (Li) closest to the side of the lag (Li)=0 at which the degree of autocorrelation (Ci) is locally minimized, for example. In the example in FIG. 13, the information processing device 100 specifies the lag=24 at which the degree of autocorrelation (Ci) is maximized. The information processing device 100 adopts the degree of autocorrelation (Ci) at the specified lag=24, as the degree of autocorrelation (Ci) of the aggregated time-series data (Ti). This allows the information processing device 100 to accurately calculate the degree of autocorrelation (Ci).

Here, a case where the information processing device 100 specifies the lag (Li) at which the degree of autocorrelation (Ci) is maximized has been described, but the lag (Li) is not limited to this case. For example, there may be a case where the information processing device 100 calculates the degree of autocorrelation (Ci) with a predetermined lag (Li) set in advance for the difference time-series data (D-Ti). In this case, the information processing device 100 may reduce the amount of processing. The predetermined lag (Li) is set by, for example, the administrator. The predetermined lag (Li) preferably corresponds to, for example, an estimated value of the period of the difference time-series data (D-Ti).

(Example of Overall Processing Procedure)

Next, an example of an overall processing procedure executed by the information processing device 100 will be described with reference to FIG. 14. The overall processing is implemented by, for example, the CPU 301, a storage area of the memory 302, the recording medium 305, or the like, and the network I/F 303 illustrated in FIG. 3.

Figure 14:
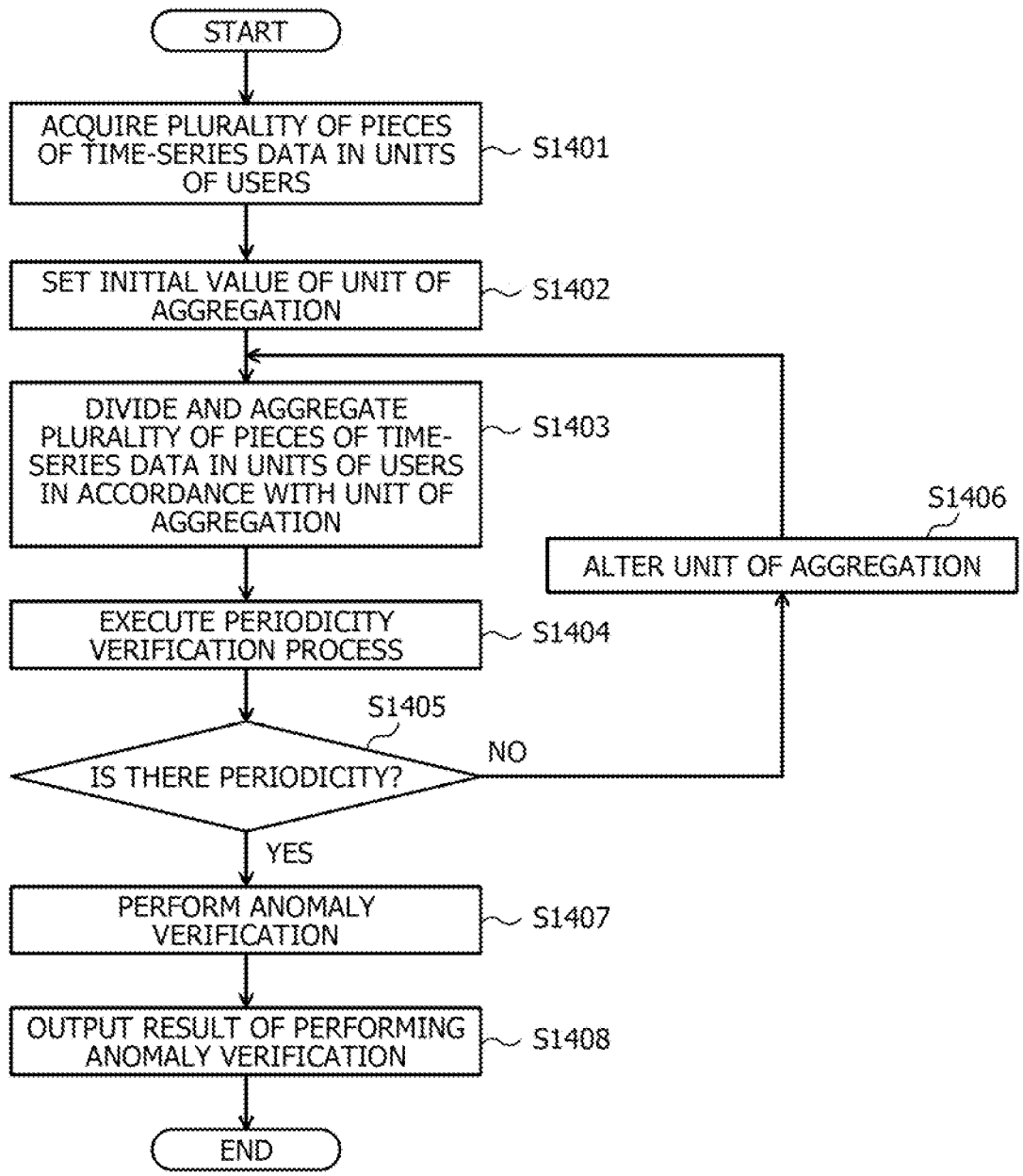
FIG. 14 is a flowchart illustrating an example of an overall processing procedure.

FIG. 14 is a flowchart illustrating an example of the overall processing procedure. In FIG. 14, the information processing device 100 acquires a plurality of pieces of time-series data in units of users (step S1401). Then, the information processing device 100 sets the initial value of the unit of aggregation (step S1402). The initial value is, for example, the minimum unit of aggregation.

Next, the information processing device 100 divides and aggregates the plurality of pieces of the time-series data in units of users in accordance with the unit of aggregation and generates a plurality of pieces of aggregated time-series data (step S1403). Then, the information processing device 100 executes a periodicity verification process described later in FIG. 18 on each piece of the aggregated time-series data among the generated plurality of pieces of the aggregated time-series data (step S1404).

Next, the information processing device 100 verifies whether or not there is periodicity in each piece of the aggregated time-series data, based on the result of executing the periodicity verification process (step S1405). Here, when there is periodicity (step S1405: Yes), the information processing device 100 proceeds to the process in step S1407. On the other hand, when there is no periodicity (step S1405: No), the information processing device 100 proceeds to the process in step S1406.

In step S1406, the information processing device 100 alters the unit of aggregation such that the unit of aggregation becomes greater than the current unit of aggregation (step S1406). Then, the information processing device 100 returns to the process in step S1403.

In step S1407, the information processing device 100 performs anomaly verification based on each piece of the aggregated time-series data (step S1407). Next, the information processing device 100 outputs the result of performing the anomaly verification (step S1408). Then, the information processing device 100 ends the overall processing. This allows the information processing device 100 to find an appropriate unit of aggregation and to accurately perform the anomaly verification in line with the appropriate unit of aggregation.

(Specific Example 1 of Overall Processing Procedure)

Next, a specific example 1 of the overall processing procedure executed by the information processing device 100 will be described with reference to FIG. 15. The overall processing is implemented by, for example, the CPU 301, a storage area of the memory 302, the recording medium 305, or the like, and the network I/F 303 illustrated in FIG. 3. The specific example 1 corresponds to a case where the information processing device 100 utilizes an Internet protocol (IP) address that is an attribute of the time-series data.

Figure 15:
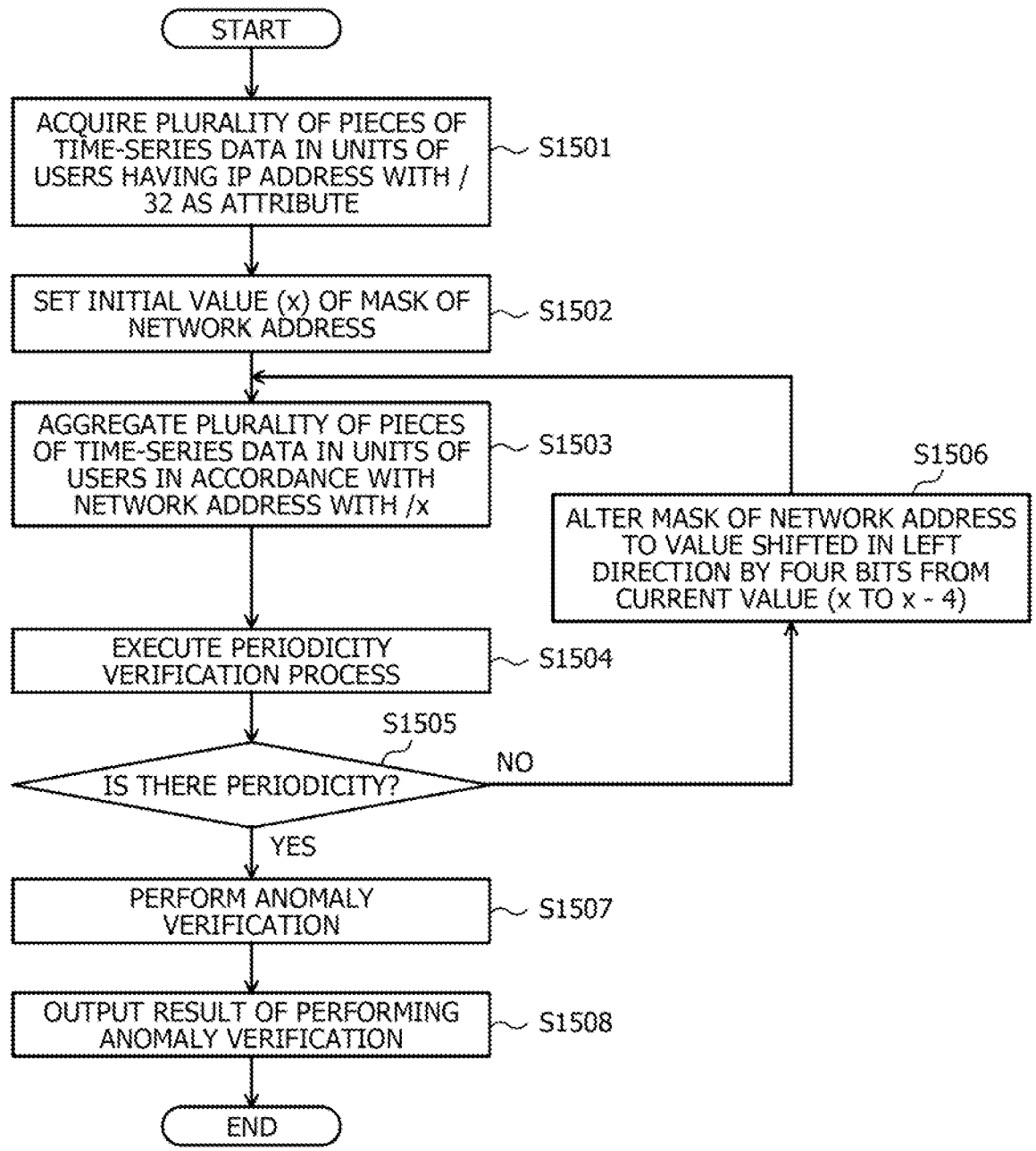
FIG. 15 is a flowchart illustrating a specific example 1 of the overall processing procedure.

FIG. 15 is a flowchart illustrating the specific example 1 of the overall processing procedure. In FIG. 15, the information processing device 100 acquires a plurality of pieces of time-series data in units of users having the IP address with /32 as an attribute (step S1501). Then, the information processing device 100 sets an initial value (x) of the mask of the network address (step S1502).

Next, the information processing device 100 aggregates the plurality of pieces of time-series data in units of users in accordance with the network address with/x and generates a plurality of pieces of aggregated time-series data (step S1503). Then, the information processing device 100 executes the periodicity verification process described later in FIG. 18 on each piece of the aggregated time-series data among the plurality of pieces of the aggregated time-series data (step S1504).

Next, the information processing device 100 verifies whether or not there is periodicity in each piece of the aggregated time-series data, based on the result of executing the periodicity verification process (step S1505). Here, when there is periodicity (step S1505: Yes), the information processing device 100 proceeds to the process in step S1507. On the other hand, when there is no periodicity (step S1505: No), the information processing device 100 proceeds to the process in step S1506.

In step S1506, the information processing device 100 alters the mask of the network address to a value shifted in the left direction by four bits from the current value (x to x−4) (step S1506). Then, the information processing device 100 returns to the process in step S1503.

In step S1507, the information processing device 100 performs anomaly verification based on each piece of the aggregated time-series data (step S1507). Next, the information processing device 100 outputs the result of performing the anomaly verification (step S1508). Then, the information processing device 100 ends the overall processing. This allows the information processing device 100 to find a mask of the network address that is appropriate as the unit of aggregation and to accurately perform anomaly verification in line with the appropriate mask of the network address.

(Specific Example 2 of Overall Processing Procedure)

Next, a specific example 2 of the overall processing procedure executed by the information processing device 100 will be described with reference to FIG. 16. The overall processing is implemented by, for example, the CPU 301, a storage area of the memory 302, the recording medium 305, or the like, and the network I/F 303 illustrated in FIG. 3. The specific example 2 corresponds to a case where the information processing device 100 utilizes the number of clusters as the unit of aggregation.

Figure 16:
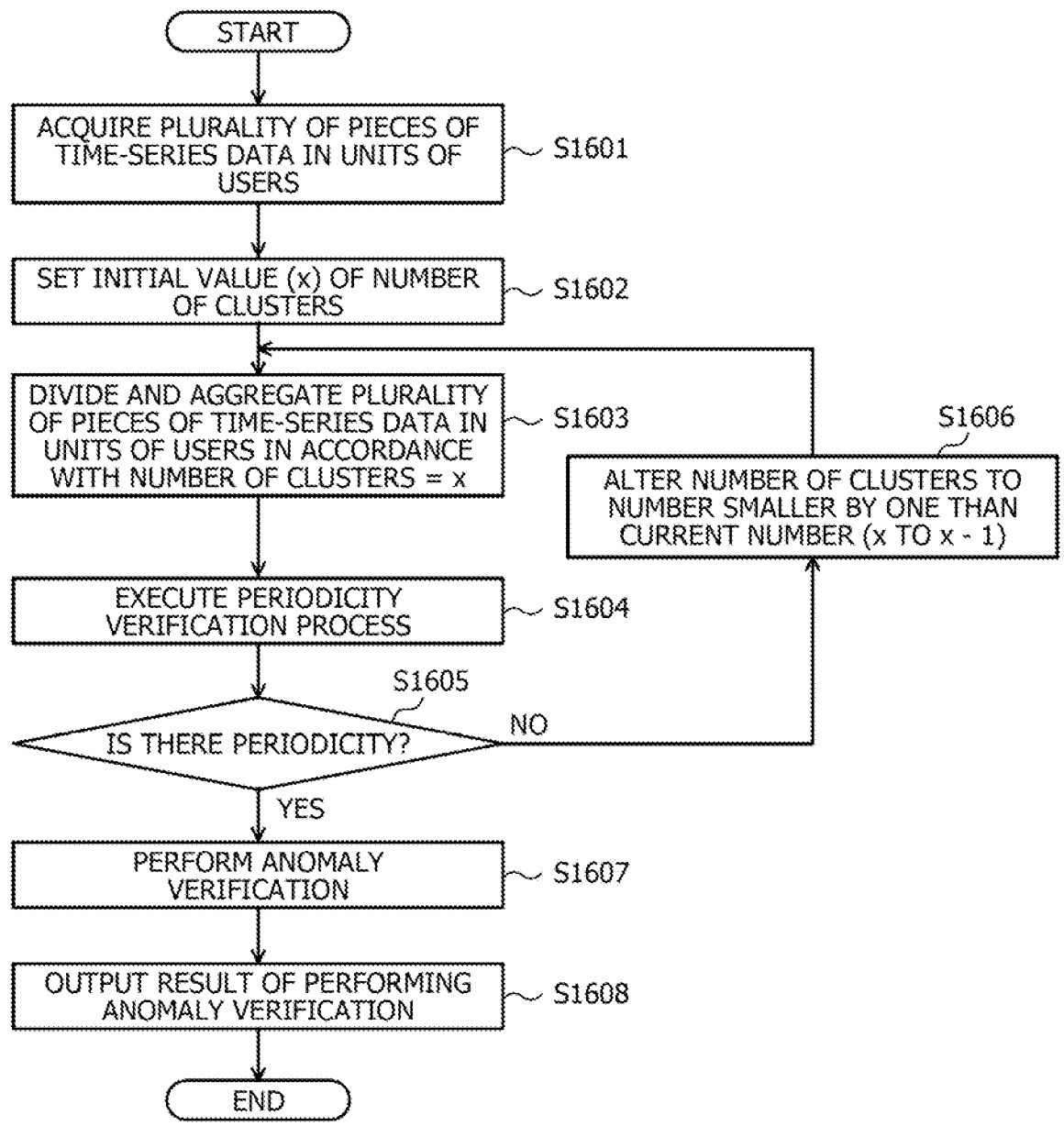
FIG. 16 is a flowchart illustrating a specific example 2 of the overall processing procedure.

FIG. 16 is a flowchart illustrating the specific example 2 of the overall processing procedure. In FIG. 16, the information processing device 100 acquires a plurality of pieces of time-series data in units of users (step S1601). Then, the information processing device 100 sets an initial value (x) of the number of clusters (step S1602).

Next, the information processing device 100 divides and aggregates the plurality of pieces of the time-series data in units of users in accordance with the number of clusters=x and generates a plurality of pieces of aggregated time-series data (step S1603). Then, the information processing device 100 executes the periodicity verification process described later in FIG. 18 on each piece of the aggregated time-series data among the plurality of pieces of the aggregated time-series data (step S1604).

Next, the information processing device 100 verifies whether or not there is periodicity in each piece of the aggregated time-series data, based on the result of executing the periodicity verification process (step S1605). Here, when there is periodicity (step S1605: Yes), the information processing device 100 proceeds to the process in step S1607. On the other hand, when there is no periodicity (step S1605: No), the information processing device 100 proceeds to the process in step S1606.

In step S1606, the information processing device 100 alters the number of clusters to a number smaller by one than the current number (x to x−1) (step S1606). Then, the information processing device 100 returns to the process in step S1603.

In step S1607, the information processing device 100 performs anomaly verification based on each piece of the aggregated time-series data (step S1607). Next, the information processing device 100 outputs the result of performing the anomaly verification (step S1608). Then, the information processing device 100 ends the overall processing. This allows the information processing device 100 to find the number of clusters that is appropriate as a unit of aggregation and to accurately perform the anomaly verification in line with the appropriate number of clusters.

(Specific Example 3 of Overall Processing Procedure)

Next, a specific example 3 of the overall processing procedure executed by the information processing device 100 will be described with reference to FIG. 17. The overall processing is implemented by, for example, the CPU 301, a storage area of the memory 302, the recording medium 305, or the like, and the network I/F 303 illustrated in FIG. 3. The specific example 3 corresponds to a case where the information processing device 100 utilizes the URL hierarchy that is an attribute of the time-series data.

Figure 17:
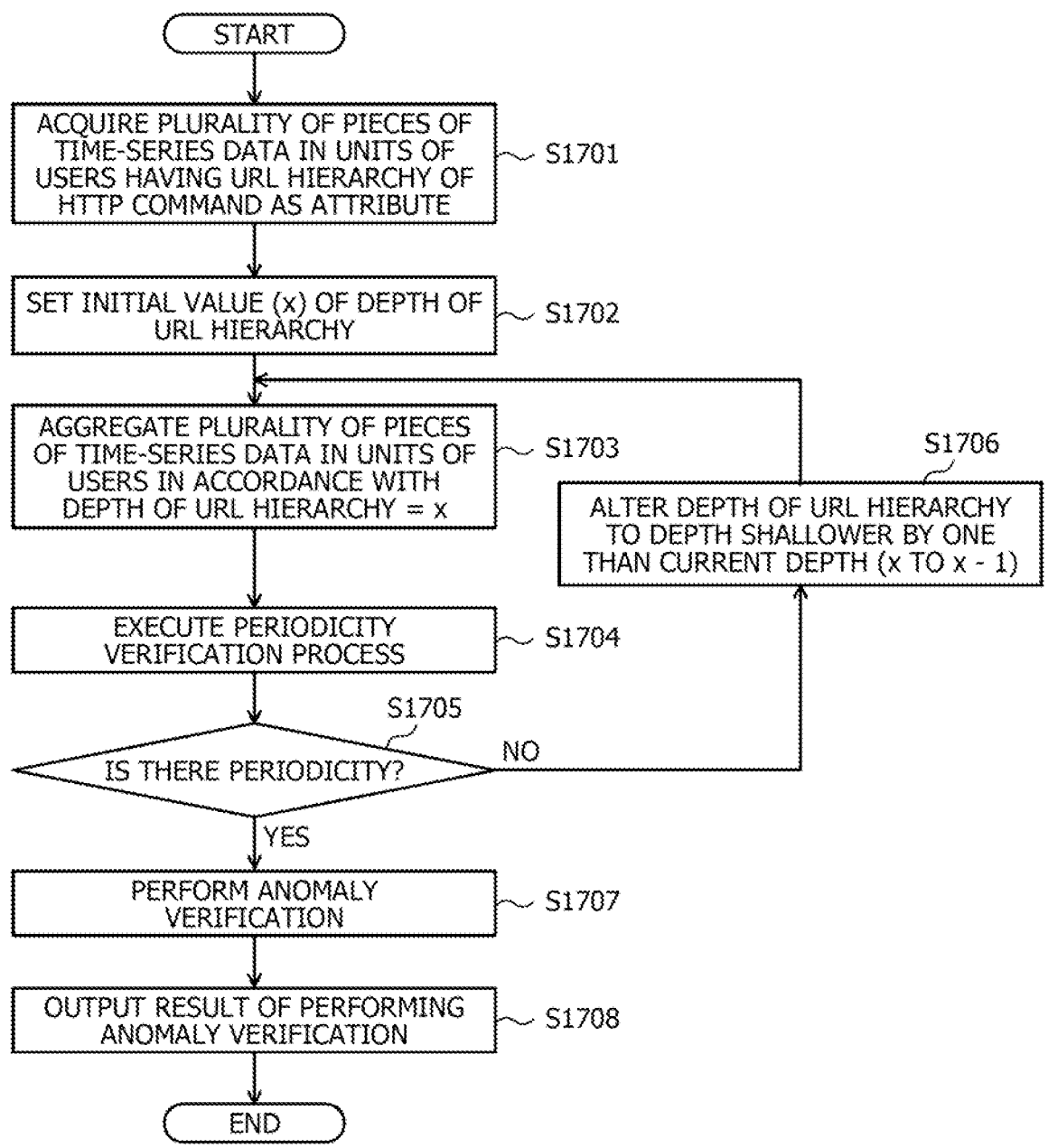
FIG. 17 is a flowchart illustrating a specific example 3 of the overall processing procedure.

FIG. 17 is a flowchart illustrating the specific example 3 of the overall processing procedure. In FIG. 17, the information processing device 100 acquires a plurality of pieces of time-series data in units of users having the URL hierarchy of the HTTP command as an attribute (step S1701). Then, the information processing device 100 sets an initial value (x) of the depth of the URL hierarchy (step S1702).

Next, the information processing device 100 aggregates the plurality of pieces of the time-series data in units of users in accordance with the depth of the URL hierarchy=x and generates a plurality of pieces of aggregated time-series data (step S1703). Then, the information processing device 100 executes the periodicity verification process described later in FIG. 18 on each piece of the aggregated time-series data among the plurality of pieces of the aggregated time-series data (step S1704).

Next, the information processing device 100 verifies whether or not there is periodicity in each piece of the aggregated time-series data, based on the result of executing the periodicity verification process (step S1705). Here, when there is periodicity (step S1705: Yes), the information processing device 100 proceeds to the process in step S1707. On the other hand, when there is no periodicity (step S1705: No), the information processing device 100 proceeds to the process in step S1706.

In step S1706, the information processing device 100 alters the depth of the URL hierarchy to a depth shallower by one than the current depth (x to x−1) (step S1706). Then, the information processing device 100 returns to the process in step S1703.

In step S1707, the information processing device 100 performs anomaly verification based on each piece of the aggregated time-series data (step S1707). Next, the information processing device 100 outputs the result of performing the anomaly verification (step S1708). Then, the information processing device 100 ends the overall processing. This allows the information processing device 100 to find a depth of the URL hierarchy that is appropriate as a unit of aggregation and to accurately perform the anomaly verification in line with the appropriate depth of the URL hierarchy.

(Example of Periodicity Verification Processing Procedure)

Next, an example of the periodicity verification processing procedure executed by the information processing device 100 will be described with reference to FIGS. 18 and 19. The periodicity verification process is implemented by, for example, the CPU 301, a storage area of the memory 302, the recording medium 305, or the like, and the network I/F 303 illustrated in FIG. 3.

Figure 18:
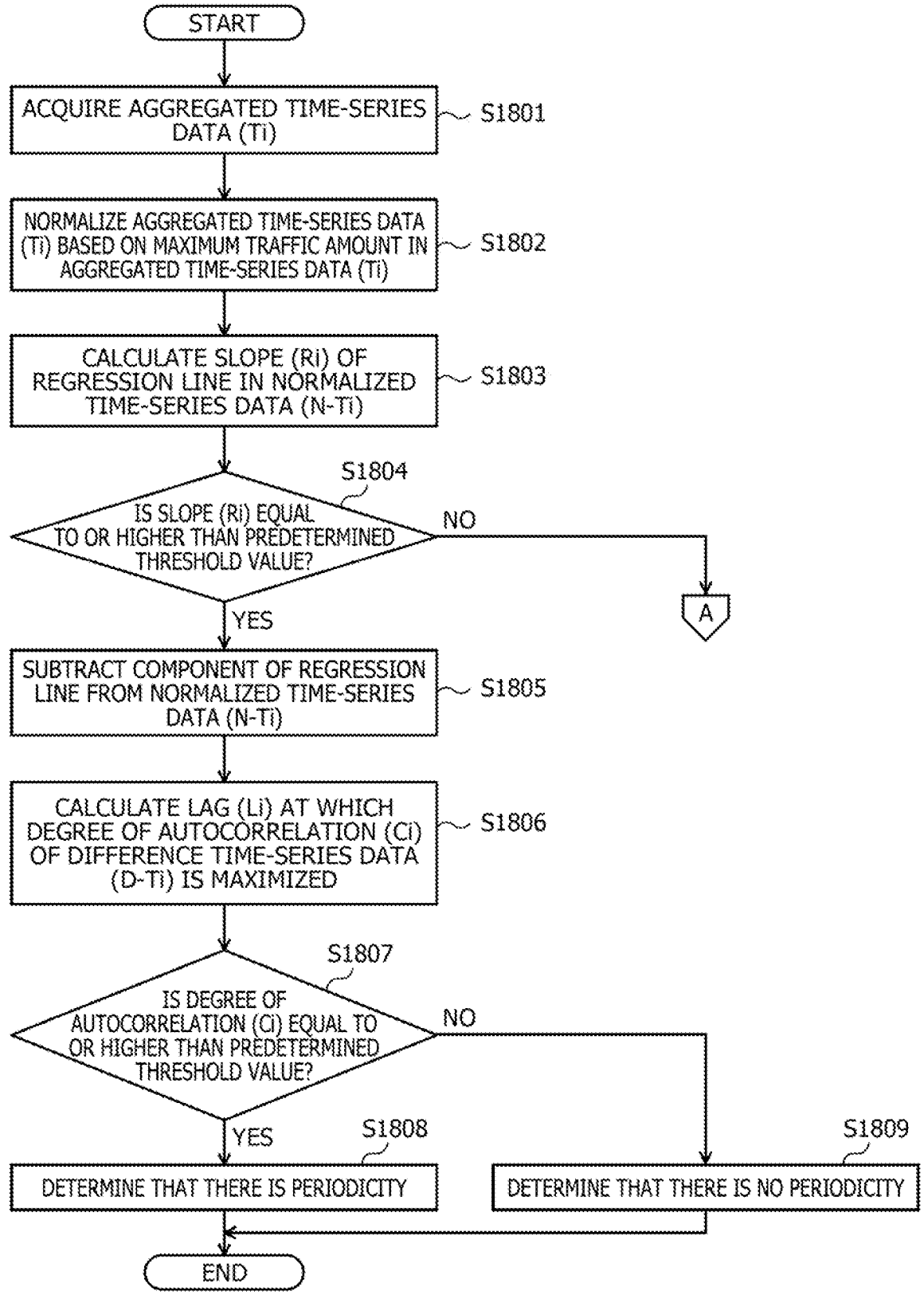
FIG. 18 is a flowchart (part 1) illustrating an example of a periodicity verification processing procedure.

FIGS. 18 and 19 are flowcharts illustrating an example of the periodicity verification processing procedure. In FIG. 18, the information processing device 100 acquires aggregated time-series data (Ti) (step S1801).

Next, the information processing device 100 normalizes the aggregated time-series data (Ti) based on the maximum traffic amount in the aggregated time-series data (Ti) and generates normalized time-series data (N-Ti) (step S1802). Then, the information processing device 100 calculates a slope (Ri) of the regression line in the normalized time-series data (N-Ti) (step S1803).

Next, the information processing device 100 verifies whether or not the slope (Ri) is equal to or higher than a predetermined threshold value (step S1804). Here, when the slope (Ri) is not equal to or higher than the predetermined threshold value (step S1804: No), the information processing device 100 proceeds to the process in step S1901 in FIG. 19. On the other hand, when the slope (Ri) is equal to or higher than the predetermined threshold value (step S1804: Yes), the information processing device 100 proceeds to the process in step S1805.

In step S1805, the information processing device 100 subtracts the component of the regression line from the normalized time-series data (N-Ti) to generate difference time-series data (D-Ti) (step S1805). Next, the information processing device 100 calculates a lag (Li) at which the degree of autocorrelation (Ci) of the difference time-series data (D-Ti) is maximized (step S1806). At this time, it is preferable for the information processing device 100 to calculate the lag (Li) at which the degree of autocorrelation (Ci) is maximized, except in the vicinity of the lag (Li)=0.

Then, the information processing device 100 verifies whether or not the degree of autocorrelation (Ci) is equal to or higher than a predetermined threshold value (step S1807). Here, when the degree of autocorrelation (Ci) is equal to or higher than the predetermined threshold value (step S1807: Yes), the information processing device 100 proceeds to the process in step S1808. On the other hand, when the degree of autocorrelation (Ci) is not equal to or higher than the predetermined threshold value (step S1807: No), the information processing device 100 proceeds to the process in step S1809.

In step S1808, the information processing device 100 determines that the aggregated time-series data (Ti) has periodicity (step S1808). Then, the information processing device 100 ends the periodicity verification process.

In step S1809, the information processing device 100 determines that the aggregated time-series data (Ti) has no periodicity (step S1809). Then, the information processing device 100 ends the periodicity verification process.

In FIG. 19, the information processing device 100 calculates the lag (Li) at which the degree of autocorrelation (Ci) of the normalized time-series data (N-Ti) is maximized (step S1901). At this time, it is preferable for the information processing device 100 to calculate the lag (Li) at which the degree of autocorrelation (Ci) is maximized, except in the vicinity of the lag (Li)=0.

Then, the information processing device 100 verifies whether or not the degree of autocorrelation (Ci) is equal to or higher than a predetermined threshold value (step S1902). Here, when the degree of autocorrelation (Ci) is equal to or higher than the predetermined threshold value (step S1902: Yes), the information processing device 100 proceeds to the process in step S1903. On the other hand, when the degree of autocorrelation (Ci) is not equal to or higher than the predetermined threshold value (step S1902: No), the information processing device 100 proceeds to the process in step S1904.

In step S1903, the information processing device 100 determines that the aggregated time-series data (Ti) has periodicity (step S1903). Then, the information processing device 100 ends the periodicity verification process.

In step S1904, the information processing device 100 determines that the aggregated time-series data (Ti) has no periodicity (step S1904). Then, the information processing device 100 ends the periodicity verification process. This allows the information processing device 100 to accurately calculate the degree of autocorrelation (Ci) that exactly represents the periodicity of the aggregated time-series data (Ti) and to accurately verify the presence or absence of the periodicity.

Here, the information processing device 100 may swap some steps in each of the flowcharts in FIGS. 14 to 19 in the processing order and execute the processing. For example, steps S1802 and S1803 may be swapped in the processing order. Furthermore, the information processing device 100 may omit the processes in some steps in each of the flowcharts in FIGS. 14 to 19. For example, the processes in steps S1802 to S1805 may be omitted.

As described above, according to the information processing device 100, a plurality of pieces of time-series data may be acquired. According to the information processing device 100, an index value relating to periodicity at a predetermined time interval may be calculated for each piece of the aggregated time-series data obtained by dividing and aggregating the acquired plurality of pieces of the time-series data in accordance with a predetermined unit of aggregation. According to the information processing device 100, when the calculated index value satisfies a predetermined condition, each piece of the aggregated time-series data may be determined as an analysis target. This allows the information processing device 100 to evaluate whether or not the unit of aggregation is appropriate and to enable the analysis processing to be accurately performed.

According to the information processing device 100, the predetermined unit of aggregation may be altered when the calculated index value does not satisfy the predetermined condition. According to the information processing device 100, the index value relating to the periodicity at the predetermined time interval may be calculated for each piece of the aggregated time-series data obtained by dividing and aggregating the acquired plurality of pieces of the time-series data in accordance with the predetermined unit of aggregation after the alteration. This allows the information processing device 100 to find an appropriate unit of aggregation from among a plurality of units of aggregation.

According to the information processing device 100, as long as the predetermined unit of aggregation is set to the minimum unit of aggregation, the predetermined unit of aggregation may be altered such that the predetermined unit of aggregation becomes greater, when the calculated index value does not satisfy the predetermined condition. This allows the information processing device 100 to efficiently find an appropriate unit of aggregation.

According to the information processing device 100, predetermined analysis processing may be performed on each piece of the aggregated time-series data determined as an analysis target. This allows the information processing device 100 to accurately perform the analysis processing in line with an appropriate aggregation range.

According to the information processing device 100, when attributes of the time-series data include the network addresses, the range of the network addresses may be adopted as the predetermined unit of aggregation. This allows the information processing device 100 to be applied to a case where the range of the network addresses is related to periodicity in the aggregated time-series data.

According to the information processing device 100, the number of pieces of the time-series data to be aggregated may be adopted as the predetermined unit of aggregation. In consequence, the information processing device 100 may allow to aggregate one or more pieces of the time-series data regardless of the attributes of the time-series data.

According to the information processing device 100, when attributes of the time-series data include the URL hierarchy of the HTTP command, the depth of the URL hierarchy may be adopted as the predetermined unit of aggregation. This allows the information processing device 100 to be applied to a case where the depth of the URL hierarchy is related to periodicity in the aggregated time-series data.

According to the information processing device 100, a condition that the calculated index value is equal to or higher than a predetermined threshold value may be adopted as the predetermined condition. In consequence, the information processing device 100 may allow to accurately evaluate that the periodicity in the aggregated time-series data is relatively strong and the statistical multiplexing effect is relatively great.

Note that the information processing method described in the present embodiment may be implemented by executing a program prepared in advance, on a computer such as a PC or a workstation. The information processing program described in the present embodiment is executed by being recorded on a computer-readable recording medium and being read from the recording medium by the computer. The recording medium is a hard disk, a flexible disk, a compact disc (CD)-ROM, a magneto-optical disc (MO), a digital versatile disc (DVD), or the like. Furthermore, the information processing program described in the present embodiment may be distributed via a network such as the Internet.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing method for a computer to execute a process comprising:
    acquiring a plurality of pieces of time-series data;
    acquiring aggregated time-series data by dividing and aggregating the plurality of pieces of the time-series data in accordance with a certain unit of aggregation;
    calculating an index value that relates to periodicity at a certain time interval for each piece of the aggregated time-series data;
    determining the each piece of the aggregated time-series data as an analysis target when the index value is more than a certain threshold;
    performing certain analysis processing on the analysis target;
    altering a unit of aggregation of a piece of the aggregated time-series data when the index value of the piece of the aggregated time-series data is less than the certain threshold; and
    recalculating an index value of the piece of the aggregated time-series data in accordance with the altered unit of aggregation.

2. The information processing method according to claim 1, wherein
    the certain unit of aggregation is set to a minimum unit of aggregation, and
    the altering includes altering the certain unit of aggregation so that the certain unit of aggregation becomes greater when the index value does not satisfy the certain threshold.

3. The information processing method according to claim 1, wherein
    the time-series data includes network addresses as attributes of the time-series data, and
    the certain unit of aggregation defines a range of the network addresses.

4. The information processing method according to claim 1, wherein the certain unit of aggregation defines a number of pieces of the time-series data to be aggregated.

5. The information processing method according to claim 1, wherein
    the time-series data includes a uniform resource locator hierarchy of a hypertext transfer protocol command as attributes of the time-series data, and
    the certain unit of aggregation defines depth of the uniform resource locator hierarchy.

6. The information processing method according to claim 1, wherein the certain threshold is a condition that the index value is equal to or higher than a certain threshold value.

7. A non-transitory computer-readable storage medium storing an information processing program that causes at least one computer to execute a process, the process comprising:
    acquiring a plurality of pieces of time-series data;
    acquiring aggregated time-series data by dividing and aggregating the plurality of pieces of the time-series data in accordance with a certain unit of aggregation;
    calculating an index value that relates to periodicity at a certain time interval for each piece of the aggregated time-series data;
    determining the each piece of the aggregated time-series data as an analysis target when the index value is more than a certain condition threshold;
    performing certain analysis processing on the analysis target;
    altering a unit of aggregation of a piece of the aggregated time-series data when the index value of the piece of the aggregated time-series data is less than the certain threshold; and
    recalculating an index value of the piece of the aggregated time-series data in accordance with the altered unit of aggregation.

8. The non-transitory computer-readable storage medium according to claim 7, wherein
    the certain unit of aggregation is set to a minimum unit of aggregation, and
    the altering includes altering the certain unit of aggregation so that the certain unit of aggregation becomes greater when the index value does not satisfy the certain threshold.

9. The non-transitory computer-readable storage medium according to claim 7, wherein
    the time-series data includes network addresses as attributes of the time-series data, and
    the certain unit of aggregation defines a range of the network addresses.

10. The non-transitory computer-readable storage medium according to claim 7, wherein the certain unit of aggregation defines a number of pieces of the time-series data to be aggregated.

11. The non-transitory computer-readable storage medium according to claim 7, wherein
    the time-series data includes a uniform resource locator hierarchy of a hypertext transfer protocol command as attributes of the time-series data, and
    the certain unit of aggregation defines depth of the uniform resource locator hierarchy.

12. The non-transitory computer-readable storage medium according to claim 7, wherein the certain threshold is a condition that the index value is equal to or higher than a certain threshold value.

13. An information processing device comprising:
one or more memories; and
one or more processors coupled to the one or more memories and the one or more processors configured to
acquire a plurality of pieces of time-series data,
acquire aggregated time-series data by dividing and aggregating the plurality of pieces of the time-series data in accordance with a certain unit of aggregation,
calculate an index value that relates to periodicity at a certain time interval for each piece of the aggregated time-series data,
determine the each piece of the aggregated time-series data as an analysis target when the index value is more than a certain condition threshold,
perform certain analysis processing on the analysis target,
alter a unit of aggregation of a piece of the aggregated time-series data when the index value of the piece of the aggregated time-series data is less than the certain threshold, and
recalculate an index value of the piece of the aggregated time-series data in accordance with the altered unit of aggregation.

* * * * *